(12) United States Patent
Yamada et al.

(10) Patent No.: US 7,852,070 B2
(45) Date of Patent: Dec. 14, 2010

(54) GMR SENSOR DEVICE HAVING AC POWER SUPPLY

(75) Inventors: Masamichi Yamada, Hitachinaka (JP); Nobuyasu Kanekawa, Hitachi (JP); Kenji Nakabayashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 426 days.

(21) Appl. No.: 11/926,583

(22) Filed: Oct. 29, 2007

(65) Prior Publication Data

US 2008/0116886 A1 May 22, 2008

(30) Foreign Application Priority Data

Oct. 30, 2006 (JP) .............................. 2006-293462
Jan. 17, 2007 (JP) .............................. 2007-007587

(51) Int. Cl.
- *G01B 7/30* (2006.01)
- *G01R 33/09* (2006.01)
- *H01L 43/06* (2006.01)

(52) U.S. Cl. ............................ 324/207.25; 324/207.21; 324/252

(58) Field of Classification Search ............ 324/207.21, 324/207.24, 207.25, 252; 702/151
See application file for complete search history.

(56) References Cited

U.S. PATENT DOCUMENTS

| 5,936,400 | A | * | 8/1999 | Tchertkov et al. ...... 324/207.21 |
| 5,945,825 | A | | 8/1999 | Clemens |
| 6,577,124 | B2 | * | 6/2003 | Coehoorn et al. ........... 324/252 |
| 2006/0136169 | A1 | * | 6/2006 | Shonai et al. ............... 702/145 |

FOREIGN PATENT DOCUMENTS

| JP | 2003-121197 A | 4/2003 |
| JP | 2005-24287 A | 1/2005 |
| JP | 2005-315840 A | 11/2005 |
| JP | 2006-170837 A | 6/2006 |
| JP | 2007-52001 A | 3/2007 |

\* cited by examiner

*Primary Examiner*—Kenneth J Whittington
(74) *Attorney, Agent, or Firm*—Crowell & Moring LLP

(57) ABSTRACT

A highly accurate displacement sensor using GMR elements for detecting displacement of a physical quantity such as angle provides a diminished waveform distortion of output voltage. At least two Wheatstone bridge circuits having a predetermined angular offset are installed, with each bridge circuit including a plurality of GMR elements. Each of the GMR elements has a fixed magnetic layer set to a predetermined magnetization direction. An AC power supply is used, and displacement of a physical quantity, such as a rotational angle, is detected on the basis of AC-modulated outputs from the bridge circuits.

13 Claims, 15 Drawing Sheets

GMR SENSOR DEVICE HAVING AC POWER SUPPLY

BACKGROUND OF THE INVENTION

1. Field of the Invention

The present invention relates to a displacement sensor using giant magnetoresistive (hereinafter referred to as GMR) elements to detect a displacement of a physical quantity such as, for example, a displacement of an angle, a gradient, or a stroke. In particular, the present invention is concerned with such a displacement sensor having means for correcting a waveform distortion of an output voltage. The present invention is also concerned with a semiconductor device used for such a sensor.

2. Description of the Related Art

Such a displacement sensor using GMR elements and a semiconductor device used for the sensor are known from, for example, JP-A-2003-121197, JP-A-2005-24287 and JP-A-2006-170837.

The GMR elements are each provided with a first magnetic layer (also called a reference magnetic layer, a fixed magnetic layer, or a pin magnetic layer) whose magnetization direction is set in a specific direction and whose magnetized state (e.g., magnetization direction or magnetization intensity in a rotational direction or in a vertical direction) is not influenced by a displacement (e.g., rotational displacement, slant displacement, or stroke displacement) of an external magnetic field and a second magnetic field (also called a detection-side magnetic layer or a free magnetic layer) whose magnetized state changes with a change of an external magnetic field.

When a relative position (a relative position in a rotational direction, a relative position in a slant direction, or a relative position in an axial direction) between an external magnetic field generator and the GMR element changes, the magnetized state of the second magnetic layer (also called a detection-side magnetic layer or a free magnetic layer) also changes, and there occurs a displacement difference in magnetized state (e.g., rotational angle, slant angle, or magnetization intensity) between the second magnetic layer and the first magnetic layer (also called a reference magnetic layer, a fixed magnetic layer, or a pin magnetic layer) whose magnetized state does not change.

The displacement difference in magnetized state between the first and second magnetic layers appears as a change in resistance value of the GMR element. A bias current is supplied to the GMR element and the change in resistance value of the GMR element is detected as a change in output voltage.

As a result, this change in detected voltage represents a displacement difference in magnetized state between the first and second magnetic layers, which indicates a displacement (e.g., a displacement in a rotational direction, a displacement in a slant direction, or a displacement of a stroke) in a relative position between the external magnetic field generator and the GMR element.

SUMMARY OF THE INVENTION

However, such a conventional displacement sensor using GMR elements involves the problem that an actual output voltage waveform obtained is deviated (called a distortion error) from an output voltage waveform obtained from a theoretical value.

This distortion error gives rise to the problem that it is impossible to enhance the accuracy of a detected displacement detected from the displacement sensor.

It is known that the distortion error is attributable to a self-bias effect (anisotropic magnetoresistive effect, AMR effect) which is generated by continued application of a DC bias current to the second magnetic layer (also called a detection-side magnetic layer or a free magnetic layer) constituting each GMR element.

In an effort to solve the above problem, various countermeasures are proposed in the foregoing patent literatures, but all of them involve demerits and are not decisive solutions.

It is an object of the present invention to diminish the self-bias effect (anisotropic magnetoresistive effect, AMR effect) generated in the second magnetic layer (also called a detection-side magnetic layer or a free magnetic layer) and thoroughly prevent the occurrence of a distortion error in output voltage of such a displacement sensor using GMR elements as referred to above, by means of a detector circuit of a simple configuration and without impairing the industrial productivity.

In the present invention, in order to achieve the above-mentioned object, there is used suppressing means for suppressing the anisotropic magnetoresistive effect which is generated in the second magnetic layer by continued application of a bias current thereto.

Specifically, the direction of the bias current is changed at a particular timing, or an AC bias current is supplied as the bias current.

In the case where the displacement sensor according to the present invention is constructed as an angle sensor, it can concretely be constructed as follows:

According to the present invention, there is provided an angle sensor comprising a stator section having a plurality of GMR elements of a multi-layer structure, the GMR elements each having at least a fixed magnetic layer having a fixed magnetization direction, a non-magnetic conductive layer and a free magnetic layer, and a rotor section adapted to form a magnetic field and rotate in opposition to the stator section, a rotational angle of the rotor section being detected from a change in resistance value caused by the magnetic field provided from the rotor section to the GMR elements, characterized in that at least two Wheatstone bridge circuits having a predetermined angular offset are installed in the stator section, the Wheatstone bridge circuits each comprising a plurality of GMR elements each having a fixed magnetic layer set in a predetermined magnetization direction, an AC power supply is used as a power supply for the Wheatstone bridge circuits, an alternating current is made flow in the plural GMR elements and a rotational angle is detected on the basis of AC-modulated outputs provided from the Wheatstone bridge circuits.

Since an alternating current is supplied to the GMR elements, the influence of a self-bias effect (anisotropic magnetoresistive effect, AMR effect) on the free magnetic layer caused by a DC current can be diminished. Consequently, it is possible to provide a highly accurate angle sensor wherein a distortion error of an output signal is remedied essentially.

In the stator section, there are installed a first Wheatstone bridge circuit comprising four GMR elements, the GMR elements each having a fixed magnetic layer set in a predetermined magnetization direction parallel or anti-parallel with respect to a reference direction in which a rotor section rotational angle θ is zero, and a second Wheatstone bridge circuit comprising four GMR elements, the GMR elements each having a fixed magnetic layer set in a predetermined ±90° direction with respect to a reference direction in which the rotor section rotational angle is zero, an AC voltage of the AC power supply is set to $\sin(\omega t)$ ($\omega$: angular frequency, t: time), and there is provided a signal processor which detects the rotational angle on the basis of a differential-amplified AC-modulated output signal $\sin\theta \sin(\omega t)$ provided from the first Wheatstone bridge circuit and a differential-amplified AC-modulated output signal $\cos\theta \sin(\omega t)$ provided from the second Wheatstone bridge circuit.

According to this construction, it is possible to provide a highly accurate angle sensor not only able to reduce the influence of the self-bias effect (anisotropic magnetoresistive effect, AMR effect) but also able to make a waveform distortion of an output voltage smaller than in the related art without the need of expanding the scale of a signal processing circuit section.

The angle sensor further comprises a signal processor which calculates the rotational angle ($\theta$) from output signals $\sin\theta$ and $\cos\theta$ in accordance with the relationship $\theta=\arctan(\sin\theta/\cos\theta)$, the output signals $\sin\theta$ and $\cos\theta$ being obtained from a differential-amplified AC-modulated output signal $\sin\theta \sin(\omega t)$ provided from the first Wheatstone bridge circuit and a differential-amplified AC-modulated output signal $\cos\theta \sin(\omega t)$ provided from the second Wheatstone bridge circuit, through a synchronous detector circuit, the synchronous detector circuit synchronously detecting an AC voltage $\sin(\omega t)$ of the AC power supply. According to this construction, it is possible to provide a highly accurate angle sensor with improved S/N of the output signal.

By constituting the synchronous detector circuit with use of at least a multiplier and an integrator (circuit), a highly accurate angle sensor with improved S/N of the output signal can be provided by a simple circuit configuration.

The angle sensor further comprises a signal processor which detects a rotational angle on the basis of output phase information on a composite output signal $\sin(\omega t-\theta)$, the composite output signal being obtained by combining an output signal $\sin\theta \cos(\omega t)$ resulting from a 90° phase shift of a differential-amplified AC-modulated output signal $\sin\theta \sin(\omega t)$ provided from the first Wheatstone bridge circuit with a differential-amplified AC-modulated output signal $\cos\theta \sin(\omega t)$ provided from the second Wheatstone bridge circuit.

According to this construction, it is possible to provide a highly accurate angle sensor not only able to reduce the influence of the self-bias effect (anisotropic magnetoresistive effect, AMR effect) but also able to make an output voltage waveform distortion smaller than in the related art without the need of expanding the scale of the signal processing circuit section.

AC voltages of the AC power supply are supplied as $\sin(\omega t)$ ($\omega$: angular frequency, t: time) and $\cos(\omega t)$ to the first and second Wheatstone bridge circuits, respectively, and there is provided a signal processor which detects a rotational angle on the basis of output phase information on a composite output signal $\sin(\omega t-\theta)$, the composite output signal $\sin(\omega t-\theta)$ being obtained by combining differential-amplified AC-modulated output signals $\sin\theta \cos(\omega t)$ and $\cos\theta \sin(\omega t)$ provided from the first and second Wheatstone bridge circuits. According to this construction, it is possible to provide a highly accurate angle sensor able to make an output voltage waveform distortion smaller than in the related art without the need of expanding the scale of the signal processing circuit section.

The angle sensor further comprises a signal processor which causes a phase variable $\phi$ to be generated from a sequential phase generator circuit, causes $\cos\theta$ and $\sin\theta$ to be generated from a sin/cos generator circuit on the basis of the phase variable $\phi$, multiplies, with use of a multiplier circuit, a differential-amplified AC-modulated output signal $\sin\theta \sin(\omega t)$ provided from the first Wheatstone bridge circuit by $\cos\phi$, multiplies, with use of a multiplier circuit, a differential-amplified AC-modulated output signal $\cos\theta \sin(\omega t)$ provided from the second Wheatstone bridge circuit by $\sin\phi$, and detects a rotational angle from the phase variable $\phi$ (=$\theta$) in which the term of $\sin(\phi-\theta)$ in a composite signal $\sin(\phi-\theta)\sin(\omega t)$ resulting from combining both the output signals by a subtractor circuit becomes zero. According to this configuration, it is possible to provide a highly accurate angle sensor able to make an output voltage waveform distortion smaller than in the related art without the need of expanding the scale of the signal processing circuit section.

A phase detector circuit in a signal processor for detecting the rotational angle comprises at least a reference signal generator circuit, a multiplier and an integrator (circuit), the multiplier being configured to multiply an input signal by a reference signal, an output of the multiplier being inputted to the integrator (circuit), and the integrator (circuit) being configured to integrate the output of the multiplier, and the reference signal generator being configured to produce the reference signal. According to this construction, it is possible to provide a highly accurate angle sensor having a high noise resistance and an improved S/N ratio of an output signal.

The angle sensor further comprises a phase detector circuit having a comparator circuit, an output of an integrator (circuit) being inputted to the comparator circuit, the comparator circuit comparing whether an output value of the integrator (circuit) is within a predetermined range or not, and when an input value of the comparator circuit deviates from the predetermined range, it is detected as an error by the phase detector circuit. According to this construction, it is possible to provide an angle sensor having an abnormal condition detecting function.

The angle sensor further comprises a phase detector circuit having a comparator circuit, and when an input value of the comparator circuit deviates from a predetermined range for a period of time longer than a predetermined duration time, it is detected as an error by the phase detector circuit. According to this construction, it is possible to provide an angle sensor having an abnormal condition detecting function.

There are plural such predetermined ranges as referred to above, the predetermined duration time is defined for each of the plural predetermined ranges, and the phase detector circuit detects a deviation from any of the predetermined ranges as an error. According to this construction it is possible to provide an angle sensor having an abnormal condition detecting function.

The angle sensor further comprises means for biasing AC power-side terminals and earth-side terminals of the Wheatstone bridge circuits, and voltage obtained by the addition of a DC reference potential and an AC voltage is applied to the AC power-side terminals.

According to this construction, it is possible to provide a highly accurate angle sensor able to make an output voltage waveform distortion smaller than in the related art and hence able to attain an integrated circuit configuration (IC configuration) without the need of expanding the scale of the signal processing circuit section.

The angle sensor further comprises a signal processor which stores in memory means a deviation angle $\alpha$ between a reference direction in which the rotational angle $\theta$ is zero and the magnetization direction of the fixed magnetic layers of the GMR elements constituting the Wheatstone bridge circuits, and then corrects and outputs the deviation angle $\alpha$ in accordance with the rotational angle ($\theta+\alpha$) obtained on the basis of phase information on the AC-modulated outputs of the Wheatstone circuits.

According to this construction, it is possible to provide a highly accurate angle sensor of a low cost not influenced by variations in characteristics and dimensional tolerance attributable to the manufacturing process and able to make an output voltage waveform distortion smaller than in the related art without the need of expanding the scale of the signal processing circuit section.

According to the present invention constructed as above, the self-bias effect (also called anisotropic magnetoresistive effect or AMR effect) generated in the second magnetic layer can be diminished fundamentally.

Concrete means for the solution is merely modifying the bias current supply means and the signal detecting program. Thus, there is no need of altering the manufacturing process for the GMR elements themselves, nor is there any fear of an increase in scale of the signal processing circuit.

DETAILED DESCRIPTION OF THE PREFERRED EMBODIMENTS

Figure 1:
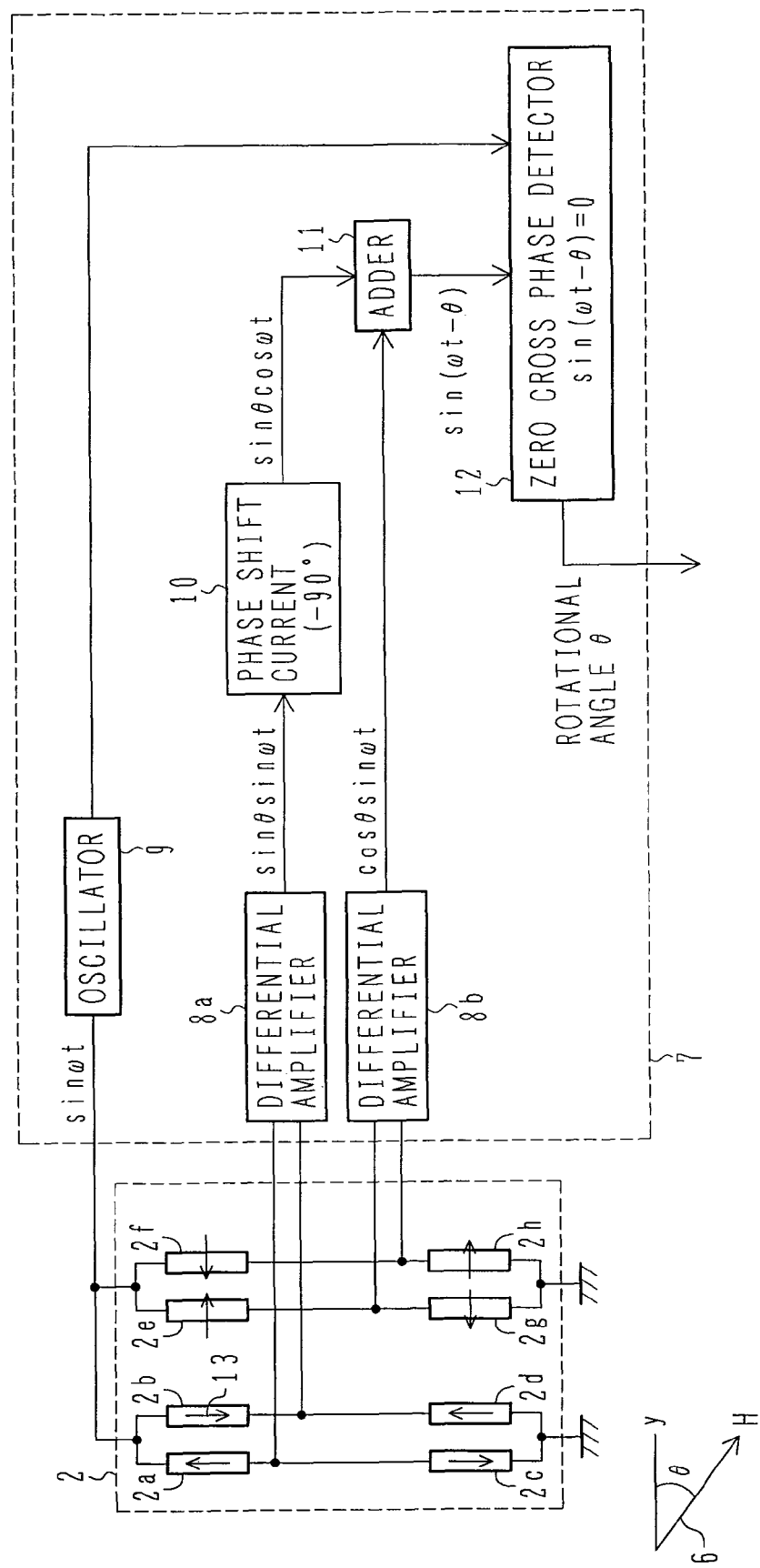
FIG. 1 is a block diagram showing the construction of an angle sensor embodying the present invention.

A detailed description will be given below about a rotational angle sensor using GMR elements as an example of practice of the present invention.

A GMR element is basically constituted by a four-layer laminate comprising an antiferromagnetic layer, a fixed magnetic layer (pin magnetic layer), a non-magnetic conductive layer and a free magnetic layer.

The direction of magnetization of the fixed magnetic layer is fixed to one direction by an exchange coupling magnetic field created between the fixed magnetic layer and the antiferromagnetic layer. On the other hand, the free magnetic layer undergoes a variation of magnetization against an external magnetic field.

The angle sensor is, for example, provided with a rotary section having a magnet above the GMR element. With rotation of the rotary section, the direction of a magnetic flux flowing from the said magnet into the laminate of the GMR element changes.

With such a change in magnetic flux, the magnetization of the free magnetic layer changes, with a consequent change in resistance value of the GMR element. From this change in element resistance value, there is determined an output voltage and an angle is detected from a change in the output voltage.

As a problem with the GMR element, also in the related art of angle sensors, there is a problem that the waveform of an output voltage obtained actually deviates from that of an output voltage obtained from a theoretical value, thus causing a distortion error to occur.

It is known that the distortion error is caused by a resistance value distortion peculiar to the GMR element. Once such a distortion error occurs, it is impossible to enhance the accuracy of an output angle detected from the angle sensor.

An MR element is a single film, while the GMR element is a multi-layer film of, for example, a four-layer structure (asymmetric in the laminate direction) comprising an antiferromagnetic layer, a fixed magnetic layer, a non-magnetic conductive layer and a free magnetic layer. The resistance value distortion of the GMR element is caused by the occurrence of a self-bias effect (anisotropic magnetoresistive effect, AMR effect) on the free magnetic layer as a constituent of the GMR element, which is induced by an electric current flowing in the GMR element.

In an effort to solve this problem, the foregoing JP-A-2003-121197 adopts means of controlling magnetic characteristics of the free magnetic layer in the GMR element to a predetermined value in order to facilitate the rotation of magnetization against an external magnetic field. However, no measure is taken therein against the aforesaid self-bias effect induced by an electric current, and this means adopted by JP-A-2003-121197 also entails difficulty in the manufacturing process.

In JP-A-2005-24287, a resistance pattern shape of the GMR element is improved to decrease the distortion error. However, not only the resistance pattern becomes complicated in shape but also the element area increases, leading to an increase of cost.

In JP-A-2006-170837, there is adopted a method wherein an output signal having a distortion error is corrected using improved circuits. This correcting method will be described below.

Figure 13:
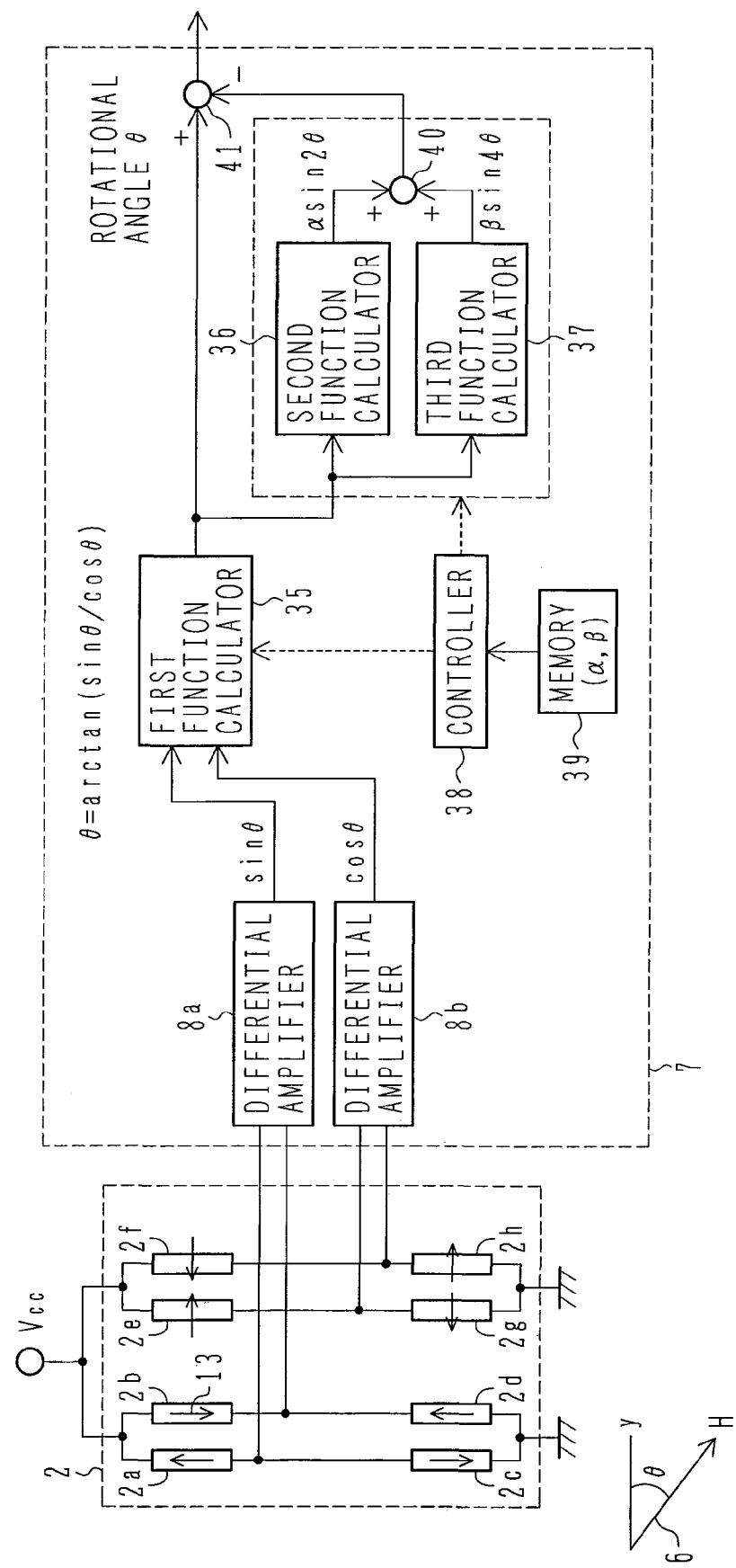
FIG. 13 is a block diagram showing the construction of a conventional angle sensor.

FIG. 13 shows a conventional angle sensor disclosed in JP-A-2006-170837.

The angle sensor is made up of a GMR element sensor section 2 and a signal processing circuit section 7. The GMR element sensor section 2 comprises two Wheatstone bridge circuits. The first Wheatstone bridge circuit is made up of four GMR elements 2a, 2b, 2c, and 2d, while the second Wheatstone bridge circuit is made up of four GMR elements 2e, 2f, 2g, and 2h. Thus, the GMR element sensor section 2 uses a total of eight GMR elements. The two Wheatstone bridge circuits are connected to earth and a DC power supply Vcc, with a direct current flowing in each GMR element.

Each GMR element has as a basic structure a four-layer laminate comprising an antiferromagnetic layer, a fixed magnetic layer (pin magnetic layer), a non-magnetic conductive layer and a free magnetic layer. The magnetization direction of the fixed magnetic layer (pin magnetic layer) is set to a predetermined direction as indicated by 13, not influenced by an external magnetic field 6.

The external magnetic field 6 rotates at a rotational angle θ from a reference position direction y. Magnetization of the free magnetic layer follows up the direction of the external magnetic field 6 and rotates (not shown). In each GMR element, the resistance value changes depending on an angular difference (φ) in the magnetization direction of the fixed magnetic layer and that of the free magnetic layer. The resistance value becomes the smallest when the magnetization direction of the fixed magnetic layer and that of the free magnetic layer are the same, while it becomes the largest when both directions are opposite to each other. A magnetic resistance change (ΔR) of the GMR element is represented as follows:

$$\Delta R \propto (1 - \cos \phi) \quad (2)$$

Thus, it is proportional to (1−cos φ).

By setting the magnetization direction 13 of the fixed magnetic layer of each GMR element shown in FIG. 13 a sin θ signal is obtained from the first Wheatstone bridge circuit (GMR elements 2a, 2b, 2c and 2d) through a differential amplifier 8a, while a cos θ signal is obtained from the second Wheatstone bridge circuit (GMR elements 2e, 2f, 2g and 2h) through a differential amplifier 8b.

In the signal processing circuit section 7, by using an inverse tangent (arctan) from both sin θ and cos θ signals obtained in a first function calculating means 35, the rotational angle θ is calculated as follows:

$$\theta = \arctan(\sin \theta / \cos \theta) \quad (3)$$

In connection with the rotational angle θ obtained by calculation as above, there actually appears a distortion error comprising sinusoidal wave signals superimposed on a straight line which actually varies linear-functionwise. It is a conventional example having a distortion error that is indicated by a broken line 33 in FIG. 13.

Figure 12:
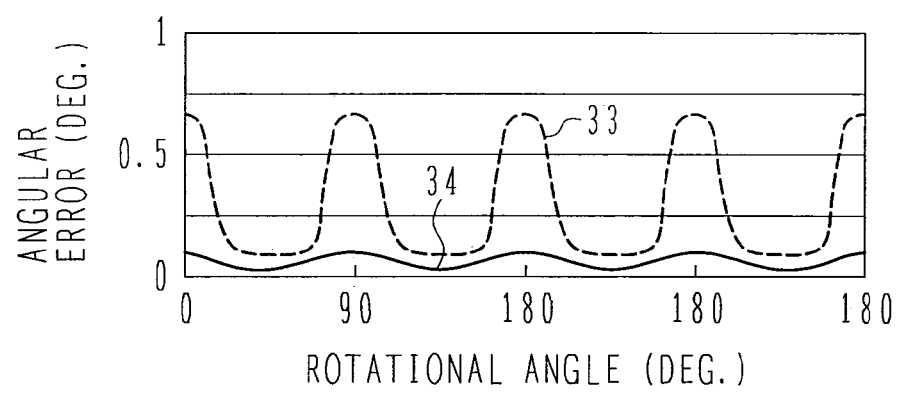
FIG. 12 illustrates output error characteristics of an angle sensor according to the present invention and a conventional angle sensor.

In the conventional example disclosed in JP-A-2006-170837, taking note of the distortion error indicated by the broken line 33 in FIG. 12, it is secondary and quartic harmonic components α sin(2θ) and β sin(4θ) in connection with the rotational angle θ that undergo a distortion error. Therefore, the amplitudes α and β of the secondary and quartic harmonic components are calculated beforehand from the results of distortion error measurement for each angle sensor and are stored in the memory means 39 to correct an output signal.

In a second function calculating means 36, the secondary harmonic component α sin(2θ) is calculated from both rotational angle θ obtained from the first function calculating means and the error amplitude value α stored in the memory means. Further, in a third function calculating means 37, the quartic harmonic component β sin(4θ) is calculated also from both rotational angle θ and the error amplitude value β stored in the memory means, and the signal of the rotational angle θ having a distortion error is thus corrected.

In the thus-constructed conventional example disclosed in JP-A-2006-170837, the distortion error of the output signal provided from the GMR element sensor section is not essentially remedied. Besides, it is necessary that correction constants α and β be stored in the memory means for each angle sensor on the basis of the results of distortion error measurement for each angle sensor, thus giving rise to the problem that the number of steps increases.

Since the plural function calculating means 35, 36, 37 are needed and the signal processing circuit section 7 becomes large-scaled due to the complicated correction calculation, the cost increases.

Accordingly, this embodiment of the present invention is for solving the above problems of the related art, and it is an object of this embodiment to provide a highly accurate angle sensor wherein the distortion error of the output signal provided from the GMR element sensor section is essentially remedied and which can make the waveform distortion of the output voltage smaller than in the related art without the need of expanding the scale of the signal processing circuit section.

Figure 2:
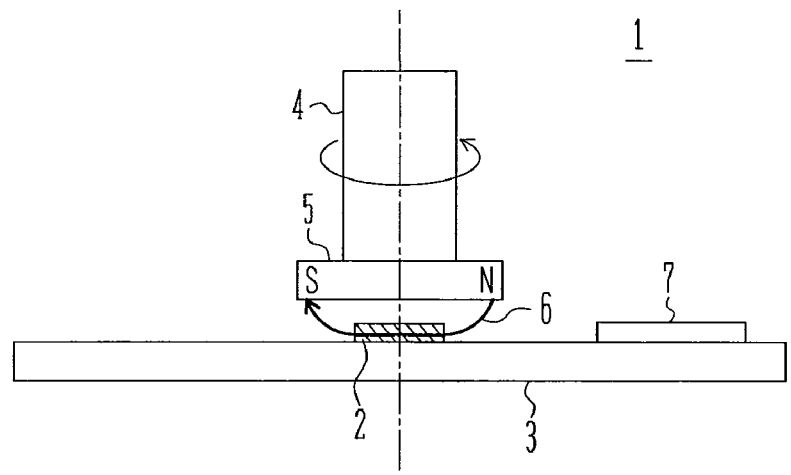
FIG. 2 is an assembly diagram of the angle sensor.

FIG. 2 shows a rotational angle sensor according to an embodiment of the present invention. A stator section is made up of a flat-plate-like support member 3 made of a non-magnetic material, a GMR element sensor section 2 positioned on an upper surface of the support member 3, and a signal processing circuit section 7.

A rotor section is made up of a rotary shaft 4 made of a non-magnetic material and a magnet 5 fixed integrally to the rotary shaft 4. The rotary shaft 4 is supported rotatably by a fixed case (not shown) so as to face the stator section at a predetermined interval. The magnet 5 is a disc-like magnet made of ferrite, for example, and is magnetized to N and S poles so as to form a uniform rotary magnetic field 6 in the GMR element sensor section 2 of the stator section.

Figure 3:
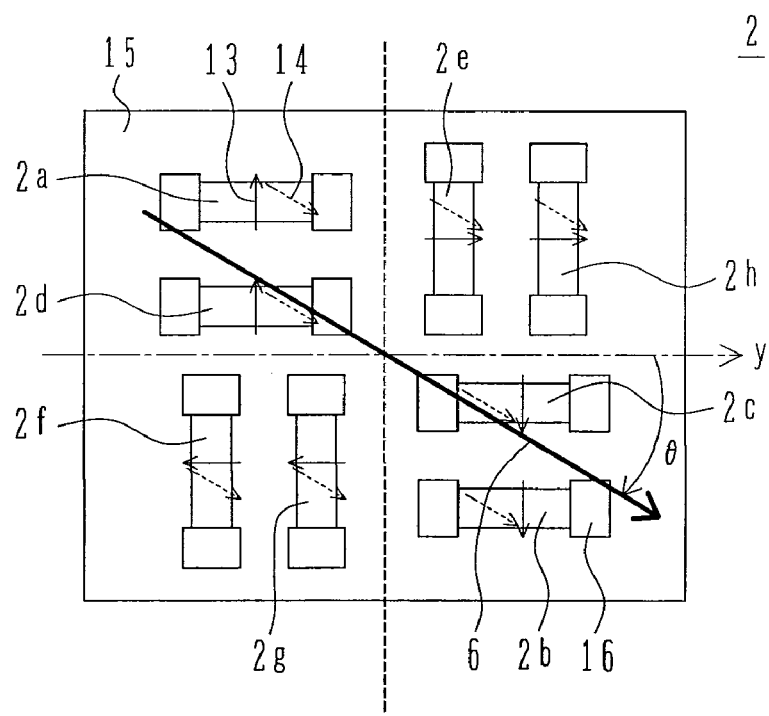
FIG. 3 is a plan view of a GMR element sensor section.

FIG. 3 is a plan view of the GMR element sensor section 2 used in the rotary angle sensor of this embodiment.

GMR elements 2a, 2b, 2c, 2d, 2e, 2f, 2g and 2h are formed on a non-magnetic substrate 15 in a predetermined shape. Numeral 16 denotes an electrode formed at both ends of each GMR element, and numeral 13 denotes a magnetization direction of a fixed magnetic layer (pin magnetic layer) of each GMR element which is magnetized in a predetermined direction with respect to a reference direction y in which the rotational angle θ of the rotor section is zero. Numeral 6 denotes an external magnetic field which is inclined at the rotational angle θ with respect to the reference direction y and which is indicated at H. Numeral 14 denotes a magnetization direction of a free magnetic layer of each GMR element which faces the direction of the external magnetic field 6.

FIG. 1 is a block diagram of the rotational angle sensor of the first embodiment of the present invention.

Each GMR element is wired (not shown) so as to constitute the two Wheatstone bridge circuits shown in FIG. 1, i.e., a first Wheatstone bridge circuit comprising four GMR elements 2a, 2b, 2c and 2d, the GMR elements 2a, 2b, 2c and 2d each having a fixed magnetic layer set in a predetermined magnetization direction parallel or anti-parallel with respect to the reference direction y of the rotational angle, and a second Wheatstone bridge circuit comprising four GMR elements 2e, 2f, 2g and 2h, the GMR elements 2e, 2f, 2g and 2h each having a fixed magnetic layer set in a predetermined ±90° magnetization direction with respect to the reference direction y of the rotational angle.

Figure 4:
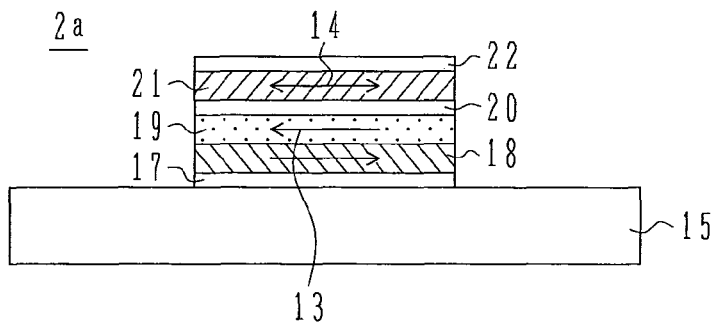
FIG. 4 is a sectional view of a GMR element.

As is seen from a sectional structure shown in FIG. 4, each GMR element is constituted by a laminate, the laminate comprising, on a non-magnetic substrate 15, an underlayer 17, an antiferromagnetic layer 18, a fixed magnetic layer (pin magnetic layer) 19, a non-magnetic conductive layer 20, a free magnetic layer 21 and a protective layer 22. The fixed magnetic layer 19 is not influenced by the external magnetic field 6 because the magnetization direction of the fixed magnetic layer 13 (pin magnetic layer) is in a strong magnetic coupling with magnetization of the antiferromagnetic layer 18.

On the other hand, the magnetization direction 14 of the free magnetic layer follows up the direction of the external magnetic field 6 which rotates at the rotational angle θ from the reference position direction y, and there occurs rotation of magnetization. In each GMR element, there occurs a change in resistance value, depending on an angular difference (φ) in the magnetization direction between the fixed magnetic layer and the free magnetic layer. The resistance value becomes minimum when the magnetization direction of the fixed magnetic layer and that of the free magnetic layer are the same, and it becomes maximum when both magnetization directions are opposite to each other. The resistance value of each GMR element changes in proportion to (1−cos φ). The rotational angle θ is detected from the change in resistance value of the GMR element.

In the present invention, as shown in FIG. 1, an AC power supply from an oscillator circuit 9 is used as the power supply to the first and second Wheatstone bridge circuits while a DC power supply has been used in the related art. The AC voltage $\sin(\omega t)$ (ω: angular frequency, t: time) on the power supply side of the Wheatstone bridge circuits is used as a drive voltage.

By such driving with the AC voltage, an AC-modulated output signal $\sin\theta \sin(\omega t)$ is obtained from the first Wheatstone bridge circuit (GMR elements 2a, 2b, 2c and 2d) through a differential amplifier 8a, and an AC-modulated output signal $\cos\theta \sin(\omega t)$ is obtained from the second Wheatstone bridge circuit (GMR elements 2e, 2f, 2g and 2h) through a differential amplifier 8b.

Figure 5A:
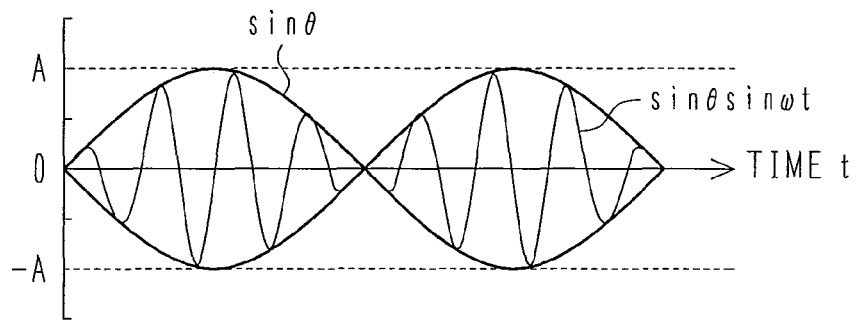
FIG. 5 illustrates waveforms of output signals provided from differential amplifiers.
Figure 5B:
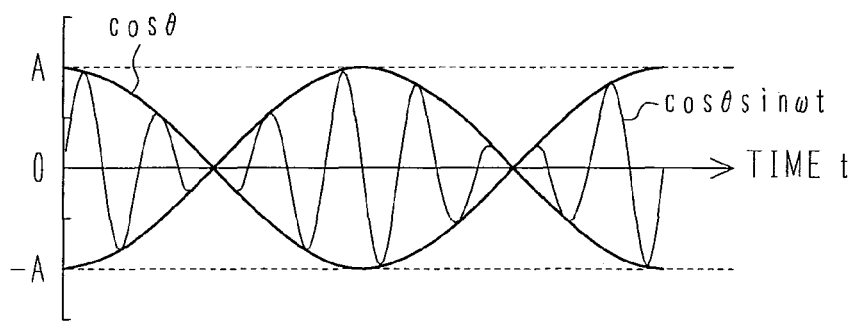

The waveform of the AC-modulated output signal $\sin\theta \sin(\omega t)$ provided from the first Wheatstone bridge circuit is shown in FIG. 5A, and that of the AC-modulated output signal $\cos\theta \sin(\omega t)$ provided from the second Wheatstone bridge circuit is shown in FIG. 5B.

If an output signal $-\sin\theta \cos(\omega t)$ resulting from a 90° phase shift of the differential-amplified AC-modulated output signal $\sin\theta \sin(\omega t)$ provided from the first Wheatstone bridge circuit by means of a phase shift circuit 10 is combined with the differential-amplified AC-modulated output signal $\cos\theta \sin(\omega t)$ provided from the second Wheatstone bridge circuit by means of an adder circuit 11, there is obtained a composite output signal $\sin(\omega t - \theta)$:

$$\cos\theta \sin(\omega t) - \sin\theta \cos(\omega t) = \sin(\omega t - \theta) \quad (4)$$

Then, in a zero cross phase detector circuit 12, the rotational angle θ is detected on the basis of phase information.

Figure 6:
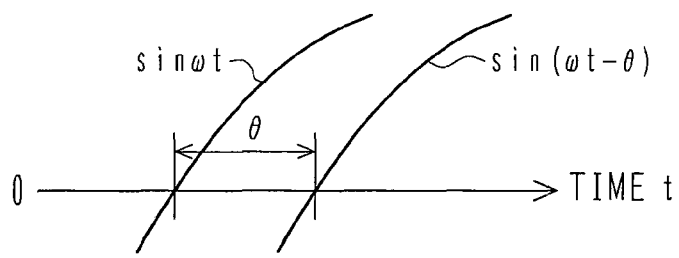
FIG. 6 is a diagram explanatory of a detection principle of a zero cross phase detector circuit.

In the zero cross phase detector circuit 12, as shown in FIG. 6, the rotational angle θ is detected from the difference between the zero cross phase of the AC voltage in the reference power supply $\sin(\omega t)$ and the zero cross phase of the output signal $\sin(\omega t - \theta)$.

In this embodiment thus constructed, since the AC power supply is used as the power supply to the Wheatstone bridge circuits unlike the DC power supply used in the conventional example, it becomes possible to diminish the waveform distortion of an output signal recognized in the conventional example.

The effects of the present invention will be described below.

Figures 7A, 7B:
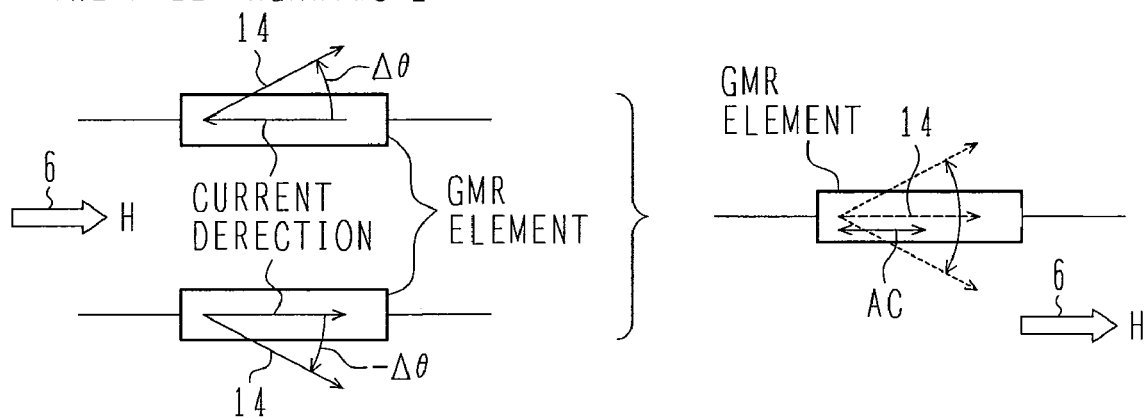
FIG. 7 is a diagram explanatory of the effect of a GMR element in case of using an alternating current.

FIG. 7A shows a conventional example in which a direct current flows in each GMR element while FIG. 7B shows a magnetization direction 14 of the free magnetic layer in each GMR element when an alternating current flows in accordance with the present invention. Reference numeral 6 denotes an external magnetic field H.

In particular, in the conventional example, when the direction of the external magnetic field 6 and that of the direct current become nearly parallel or anti-parallel to each other, the magnetization direction 14 of the free magnetic layer is influenced by a self-bias magnetic field (anisotropic magnetoresistive effect, AMR effect) caused by the direct current flowing in each GMR element.

It is necessary that the magnetization direction 14 of the free magnetic layer be coincident with the direction of the external magnetic field 6, but when a direct current flows in each GMR element, the magnetization direction 14 of the free magnetic layer is influenced and tilted by the self-bias magnetic field induced by the direct current because in the multi-layer structure of the GMR element shown in FIG. 4, the free magnetic layer 14 is positioned near the surface side with respect to the center of the distribution of the direct current flowing through the whole multi-layer structure.

In FIG. 7A, when the direct current is anti-parallel to the direction of the external magnetic field 6, the self-bias magnetic field induced by the direct current acts in a Δθ direction and the magnetization direction 14 of the free magnetic layer rotates in a counterclockwise direction. When the direct current is parallel to the direction of the magnetic field 6, the self-bias magnetic field acts in a −Δθ direction, and the magnetization direction 14 of the free magnetic layer rotates in a clockwise direction.

Thus, for obtaining an ideal output voltage waveform, it is required that the magnetization direction 14 of the free magnetic layer be the same as the direction of the external magnetic field 6. However, the magnetization direction 14 of the free magnetic layer, in fact, does not become completely the same as the direction of the external magnetic field 6, and an actual output voltage waveform obtained somewhat deviates from that obtained theoretically.

As shown in FIG. 3, the direct current flowing in the GMR elements 2a, 2b, 2c and 2d which constitute the first Wheatstone bridge circuit is perpendicular to the reference direction y while the direct current flowing in the GMR elements 2e, 2f, 2g and 2h which constitute the second Wheatstone bridge circuit is parallel to the reference direction y. The direct currents flowing in the GMR elements constituting the first and second Wheatstone bridge circuits flow in directions different from each other by 90°.

Therefore, when the external magnetic field 6 rotates at the rotational angle θ, the direction of the external magnetic field 6 and that of the direct current flowing in each GMR element become parallel and anti-parallel to each other on a 90° cycle, leading to a waveform distortion of an output signal under the influence of the self-bias magnetic field induced by the direct current. The above reason accounts for a phenomenon of the angle error increasing on a 90° cycle in the conventional example indicated by the broken line 33 in FIG. 12.

On the other hand, in the present invention, since an alternating current flows in each GMR element, the magnetization direction 14 of the free magnetic layer in the GMR element somewhat deflects from the direction of the external magnetic field 6 as shown in FIG. 7B. However, the magnetization direction 14 of the free magnetic layer becomes coincident with the direction of the external magnetic field 6 on a time average by making each frequency ω of the alternating current high. It is thus possible to diminish the influence of the self-bias magnetic field (anisotropic magnetoresistive effect, AMR effect) induced by the direct current in the conventional example.

A solid line 34 in FIG. 12 shows an example of measurement of an angle error of the rotational angle sensor according to this embodiment. It is seen that the angle error and the output signal waveform distortion are drastically remedied in comparison with the conventional example.

In the present invention, since an alternating current is run in each GMR element, the influence of hysteresis in each magnetic layer as a constituent of each GMR element and that of a magnetic shape anisotropy effect based on pattern shape can also be diminished, thereby diminishing the angle error (output signal waveform distortion) as well.

In the present invention, as shown in FIG. 3, the GMR elements 2a, 2b, 2c, 2d, 2e, 2f, 2g and 2h are formed in a predetermined shape on the non-magnetic substrate 15. The same effect can be obtained when each GMR element is formed on separate non-magnetic substrates and mounted integrally. Further, the still same effect can be obtained when sets of the GMR elements: 2a and 2d; 2f and 2g; 2e and 2h; 2b and 2c, each of which has the same magnetization directions of the respective fixed magnetic layers, are formed on separate non-magnetic substrates, respectively, and mounted integrally.

In the multi-layer structure of each GMR element in the present invention, for example, Ta or Cr is selected as the material of the underlayer 17, a thin PtMn alloy layer as the antiferromagnetic layer 18, a thin FeNi alloy film as the fixed magnetic layer (pin magnetic layer), Cu as the non-magnetic conductive layer 20, a thin FeNi alloy film as the free magnetic layer 21, Ta or Cr as the protective layer 22, and Au or Cu as an electrode material 16.

Cu as the non-magnetic conductive layer 20 is placed between the fixed magnetic layer 19 and the free magnetic layer 21, and functions to separate the fixed magnetic layer 19 and the free magnetic layer 21 from each other magnetically. The thickness of the free magnetic layer 21 is selected to a value of 1.5 to 8 nm. If the free magnetic layer 21 is too thick, a magnetic moment per unit area of the free magnetic layer 21 increases, and it becomes difficult for the magnetization of the same layer to rotate. Conversely, if the free magnetic layer 21 is too thin, the rate of change in resistance by a GMR effect decreases, deteriorating the sensitivity of the angle sensor. The free magnetic layer 21 is formed in the absence of a magnetic field or in a rotating magnetic field in order not to impart an induced magnetic anisotropy during film formation.

Figure 8:
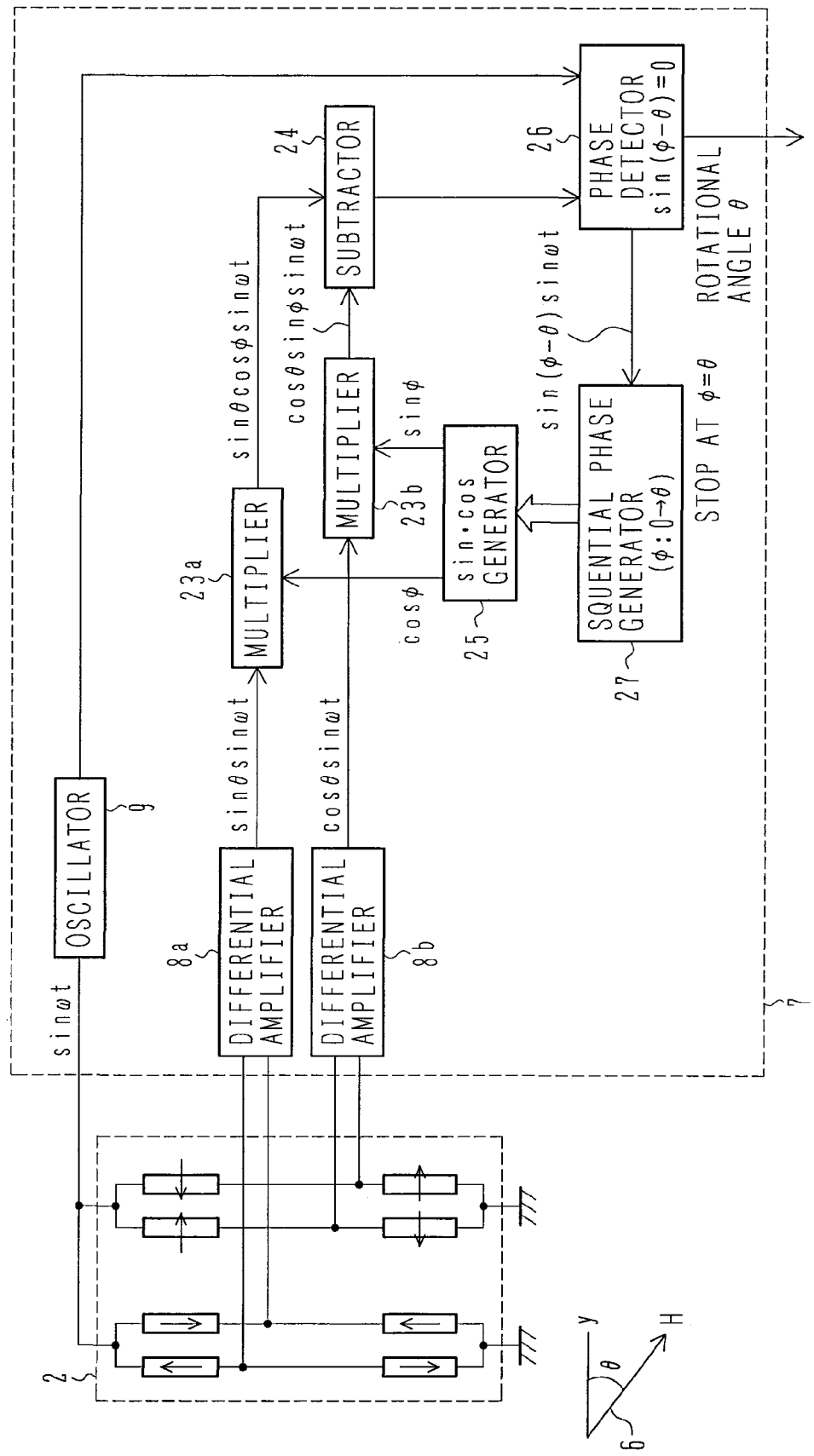
FIG. 8 is a block diagram showing the construction of an angle sensor according to another embodiment of the present invention.

FIG. 8 is a block diagram of a rotational angle sensor according to a second embodiment of the present invention.

In this second embodiment, a GMR element sensor section 2 is of the same construction as that in the first embodiment, with a signal processing section 7 in the second embodiment being different in construction from that used in the first embodiment.

When the AC voltage $\sin(\omega t)$ is applied from the oscillator circuit 9 to the first and second Wheatstone bridge circuits in the GMR element sensor section 2, an AC-modulated output signal $\sin\theta \sin(\omega t)$ is obtained from the first Wheatstone bridge circuit (GMR elements 2a, 2b, 2c and 2d) through the differential amplifier 8a, while an AC-modulated output signal $\cos\theta \sin(\omega t)$ is obtained from the second Wheatstone bridge circuit (GMR elements 2e, 2f, 2g and 2h) through the differential amplifier 8b.

Next, a phase variable $\phi(0\rightarrow\theta)$ is generated from a sequential phase generator circuit 27, and $\cos\phi$ and $\sin\phi$ are generated from a sin/cos generator circuit 25 on the basis of the phase variable $\phi$. Then, with use of multiplier circuits 23a and 23b, the differential-amplified AC-modulated $\sin\theta \sin(\omega t)$ provided from the first Wheatstone bridge circuit is multiplied by $\cos\phi$, while the differential-amplified AC-modulated output signal $\cos\theta \sin(\omega t)$ provided from the second Wheatstone bridge circuit is multiplied by $\sin\phi$. Both of the output signals are combined by a subtractor circuit 24. A composite signal $\sin(\phi-\theta)\sin(\omega t)$ can be obtained in accordance with the following equation:

$$\sin\phi \cos\theta \sin(\omega t) - \cos\phi \sin\theta \sin(\omega t) = \sin(\phi-\theta)\sin(\omega t) \quad (5)$$

Accordingly, a phase variable $\phi$ ($=\theta$) at which the term of $\sin(\phi-\theta)$ becomes zero is detected and outputted by a phase detector circuit 26.

Thereafter, another phase variable $\phi(0\rightarrow\theta)$ is generated from the sequential phase generator circuit 27 by a trigger signal provided from the phase detector circuit 26, followed by the repetition of the above operations to output the rotational angle $\theta$ in a continuous manner.

According to the above construction, not only the same effects as in the first embodiment can be obtained, but also the digitalization of the signal processing section can be simplified.

Figure 9:
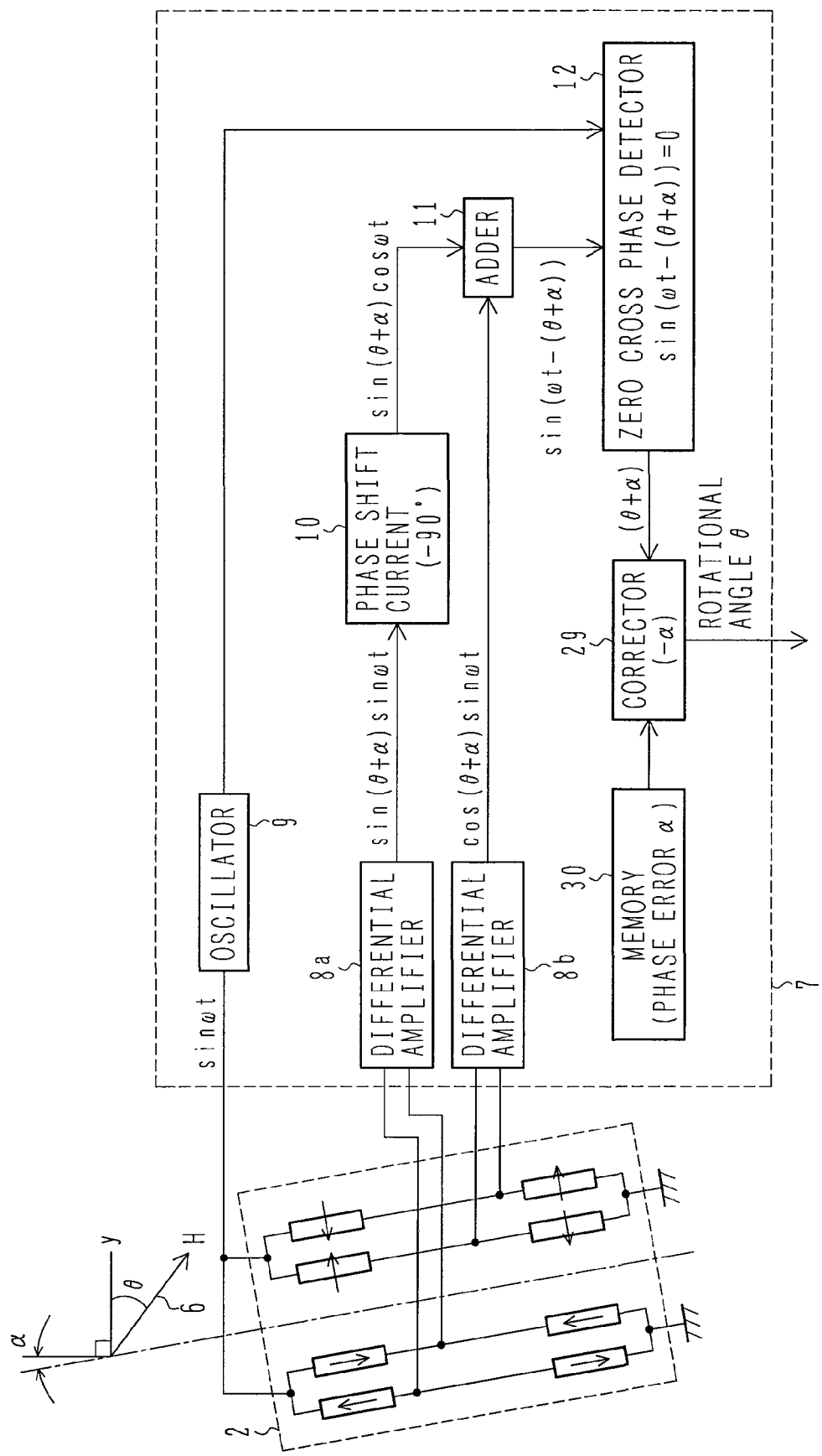
FIG. 9 is a block diagram showing the construction of an angle sensor according to a further embodiment of the present invention.

FIG. 9 is a block diagram of a rotational angle sensor according to a third embodiment of the present invention.

In this third embodiment, a description will be given about a method for correction in the case where the reference rotational direction y of the rotor section and the magnetization direction 13 of the fixed magnetic layer which is a reference direction of the GMR element sensor section 2 deviate from each other by a variation angle α.

Ideally, the deviation angle α is required to be zero. However, it does not become zero due to, for example, variations in the manufacturing process and mounting. It is presumed that such variations occur mainly in a magnetizing process for setting the magnetization direction 13 of the fixed magnetic layer in each GMR element, an etching process at the time of forming a resistance pattern of each GMR element, an integral mounting process of each GMR element substrate, and an assembling process of the stator section and the rotor section.

The deviation angle α can be easily detected as an offset angle (an output value in the reference rotational direction of the rotor section: $\theta=0°$) of an angular output value measured by rotating the rotor section with use of a predetermined measuring device after the final assembly of each rotational angle sensor. The thus-detected deviation angles α of each rotational angle sensor are stored in a memory circuit 30 installed in the associated signal processing section 7.

Since the output signal from the GMR element sensor section 2 is phase-shifted by the deviation angle α relative to the rotational angle θ, the output from the zero cross phase detector circuit 12 shown in FIG. 9 becomes ($\theta+\alpha$). A corrector circuit 29 subtracts the deviation angle α stored beforehand in the memory circuit 30 from the output ($\theta+\alpha$) provided from the zero cross phase detector circuit 12 and corrects and outputs it.

By thus providing the memory circuit 30 and the corrector circuit 29 in the signal processing section 7, there is realized a highly accurate angle sensor that is not influenced by variations in characteristics and dimensional tolerance that occur in the manufacturing process. Although in the embodiment illustrated in FIG. 9, there is described the signal processing section 7 of the same system as in the first embodiment, the system of the second embodiment can also be adopted, which makes no difference in the resultant effects.

Figure 10:
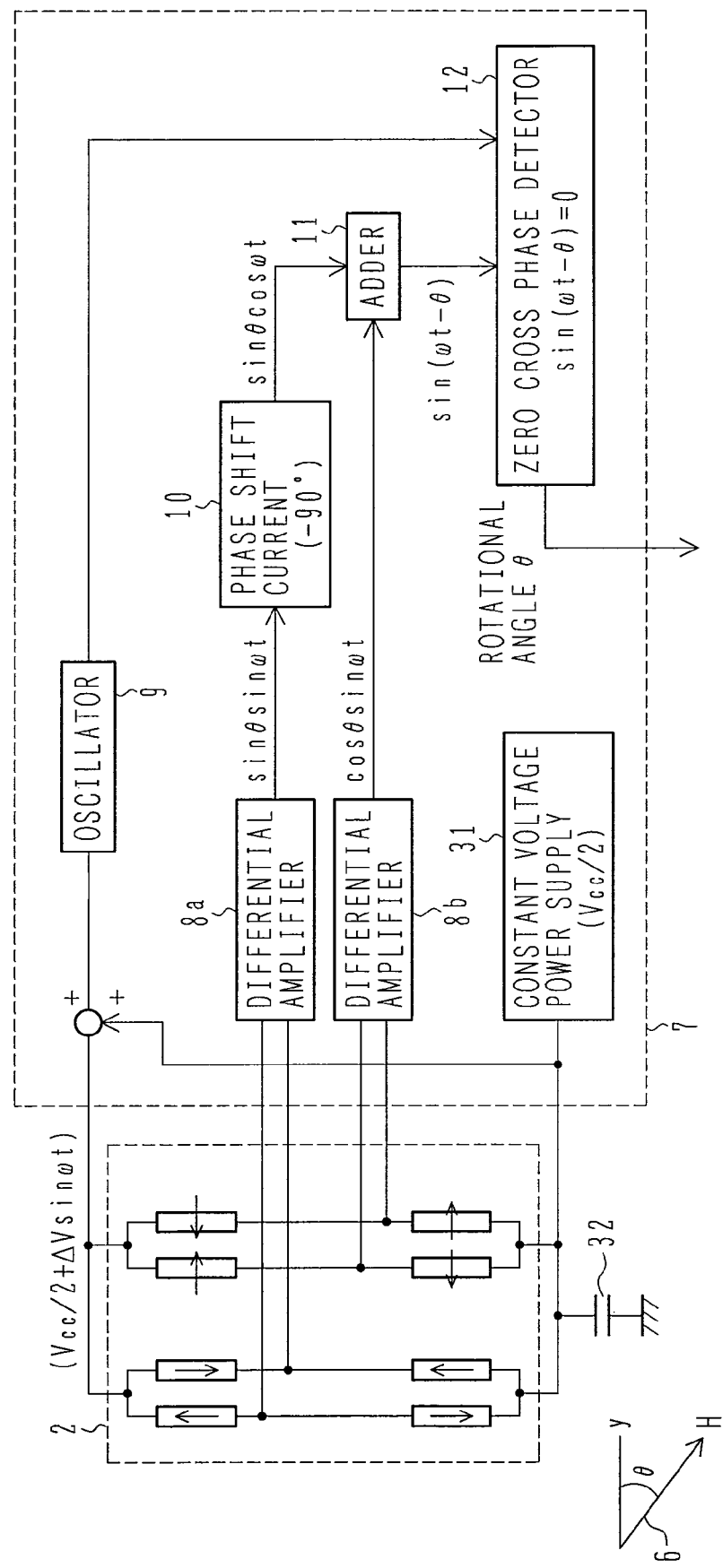
FIG. 10 is a block diagram showing the construction of an angle sensor according to a still further embodiment of the present invention.

FIG. 10 is a block diagram of a rotational angle sensor according to a fourth embodiment of the present invention.

In this fourth embodiment, the construction of a power supply to the first and second Wheatstone bridge circuits in the GMR element sensor section 2 is different from that in the previous embodiments. In the previous embodiments, the AC voltage sin(ωt) is applied to the power-supply-side terminals of the Wheatstone bridge circuits, and the earth-side terminals are connected to ground. Therefore, a minus power supply is needed for the oscillator circuit 9 in the signal processing section 7, thus making a circuit configuration complicated.

On the other hand, in this fourth embodiment, earth-side terminals of the Wheatstone bridge circuits are floated directly from the ground by a capacitor 32 and is connected to a constant voltage source 31 for bias to a DC potential of Vcc/2. On the other hand, as to power-supply-side terminals of the Wheatstone bridge circuits, the DC potential Vcc/2 of the constant voltage source 31 and the AC voltage sin(ωt) of the oscillator circuit 9 are added and applied to the power-supply-side terminals.

Figure 11:
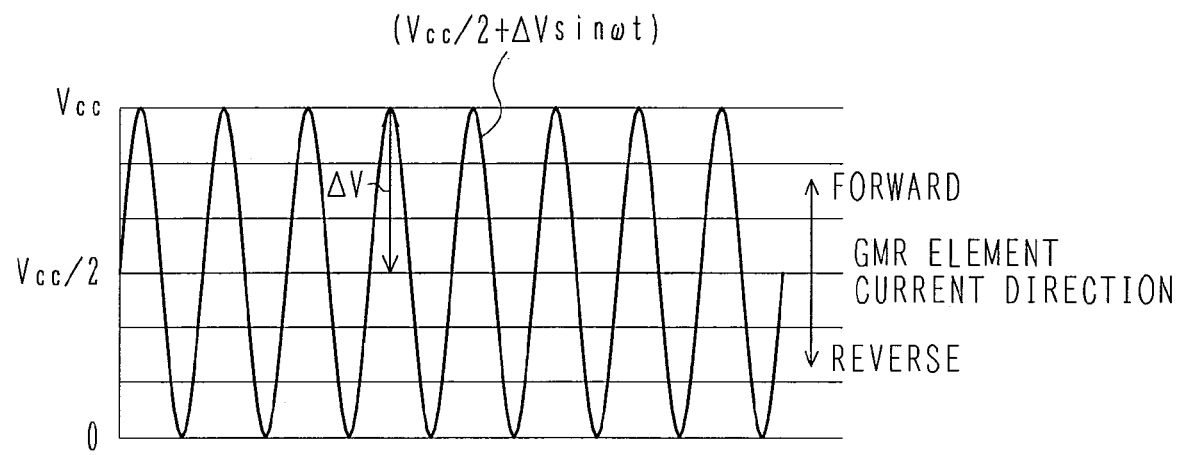
FIG. 11 illustrates a DC-biased supply voltage waveform.

FIG. 11 shows a voltage waveform applied to the power-supply-side terminals of the Wheatstone bridge circuits. By selecting ΔV such that the applied voltage (Vcc/2+ΔV sin(ωt)) becomes a predetermined positive voltage falling under the range of 0 to Vcc, an electric current flows in the forward direction through the GMR elements at an AC voltage corresponding to the reference potential Vcc/2 or more, while at an AC voltage below Vcc/2, an electric current flows in the opposite direction through the GMR elements, whereby an alternating current can be supplied to the GMR elements.

Since an alternating current thus flows in the GMR elements, not only it is possible to diminish the influence of the self-bias magnetic field (anisotropic magnetoresistive effect, AMR effect) induced by a direct current in the related art, but also a minus power supply is no longer needed in the signal processing section 7, making it possible to achieve an integrated circuit configuration (IC configuration) without expanding the scale of the circuit section.

Figure 14:
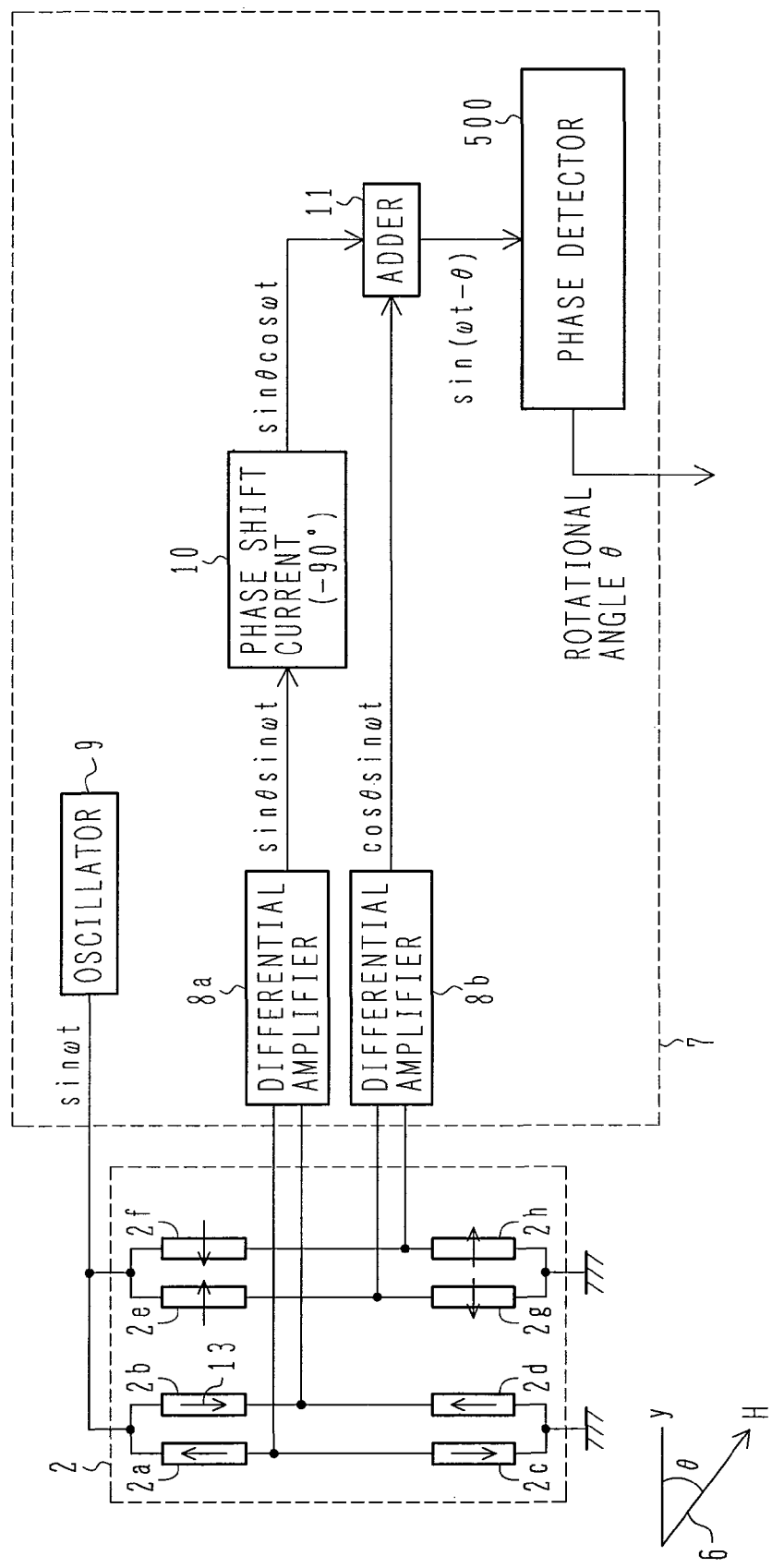
FIG. 14 is a block diagram showing the construction of an angle sensor according to a still further embodiment of the present invention.
Figure 15:
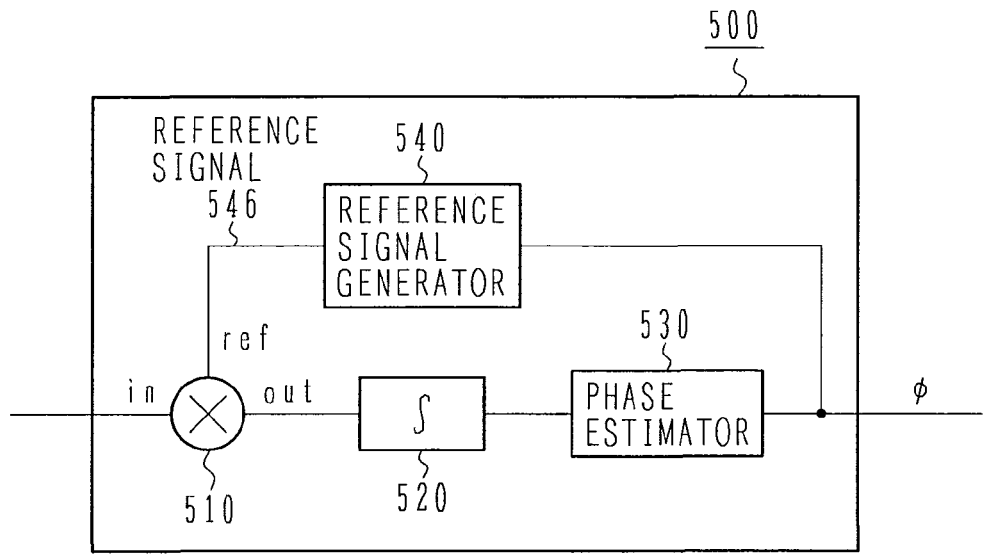
FIG. 15 is a block diagram of a phase detector circuit.

FIG. 14 is a block diagram of a rotational angle sensor according to a fifth embodiment of the present invention. In this fifth embodiment, the zero cross phase detector circuit 12 described in the first embodiment illustrated in FIG. 1 is substituted by a phase detector circuit 500 which is highly resistant to noise. The phase detector circuit 500 has such a configuration as shown in FIG. 15.

Figure 16:
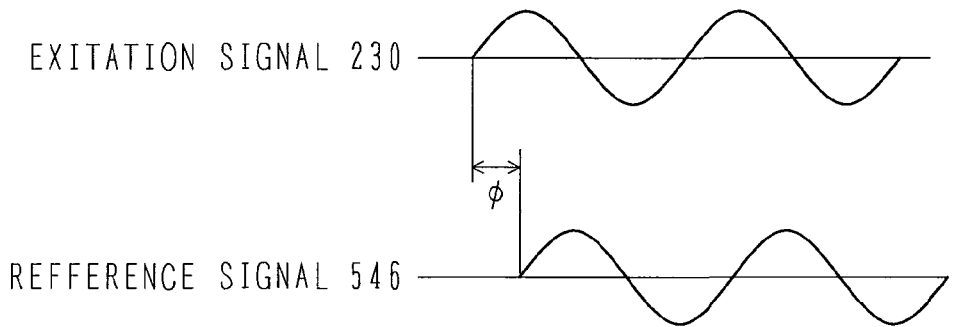
FIG. 16 is an explanatory diagram of the phase detector circuit.

In the phase detector circuit 500, a reference signal 546 and an input signal "in" are multiplied by each other in a multiplier 510, and the resulting product is inputted to an integrator (circuit) 520 and is then inputted to a phase estimating circuit 530. A phase difference φ estimated in the phase estimating circuit 530 is outputted as an estimated value of θ and is inputted to a reference signal generator circuit 540, which in turn outputs a reference signal 546, the reference signal 546 being phase-shifted by φ from an excitation signal 230, as shown in FIG. 16.

Figure 17:
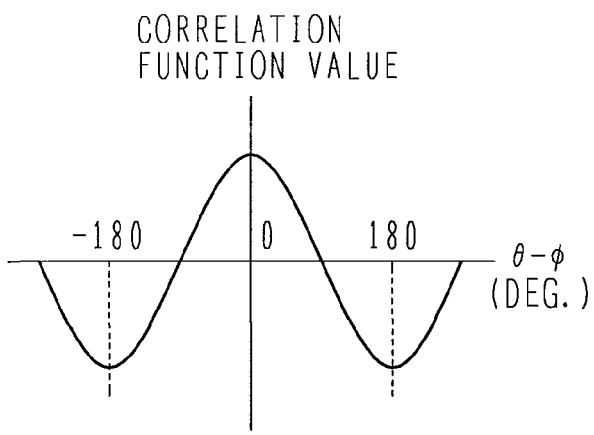
FIG. 17 is an explanatory diagram of the phase detector circuit.

By multiplying the reference signal 546 and the input signal "in" by each other in the multiplier 510 and by subsequent integration in the integrator 520, it is possible to obtain a correlation function value of the input signal "in" and the reference signal 546. FIG. 17 shows a correlation function value for the phase θ to be obtained and the estimated phase difference φ.

This correlation function value utilizes the property that in case of the input signal "in" and the reference signal 546 being of the same frequency, the correlation function value varies depending on the phase difference and becomes maximum upon phase coincidence. That is, if convergence is made while searching for the phase difference φ corresponding to the maximum correlation function value in the phase estimating circuit 530, the value obtained is an estimated value of the phase θ to be obtained.

The noise component is different in period from the reference signal or the excitation signal, the correlation function becomes almost zero, with no influence exerted on the converging operation. Therefore, it is possible to greatly diminish the influence of noise on the phase detection result φ. Likewise, offset voltage deviations of output signals from the Wheatstone bridge circuits of GMR elements are DC components and different in period from the reference signal or the excitation signal, so that the correlation function becomes almost zero and no influence is exerted on the converging operation.

Thus, according to this fifth embodiment, it is possible to provide a highly accurate angle sensor of a simple circuit configuration and with an improved S/N ratio of an output signal.

Moreover, although in this fifth embodiment, the phase detector circuit 500 higher in noise resistance is applied to the zero cross phase detector circuit 12 described in the first embodiment, it is evident that the same effect is obtained also in its application to the phase detector circuit 26 in the second embodiment and the zero cross phase detector circuit 12 in the third and fourth embodiments.

Figure 18:
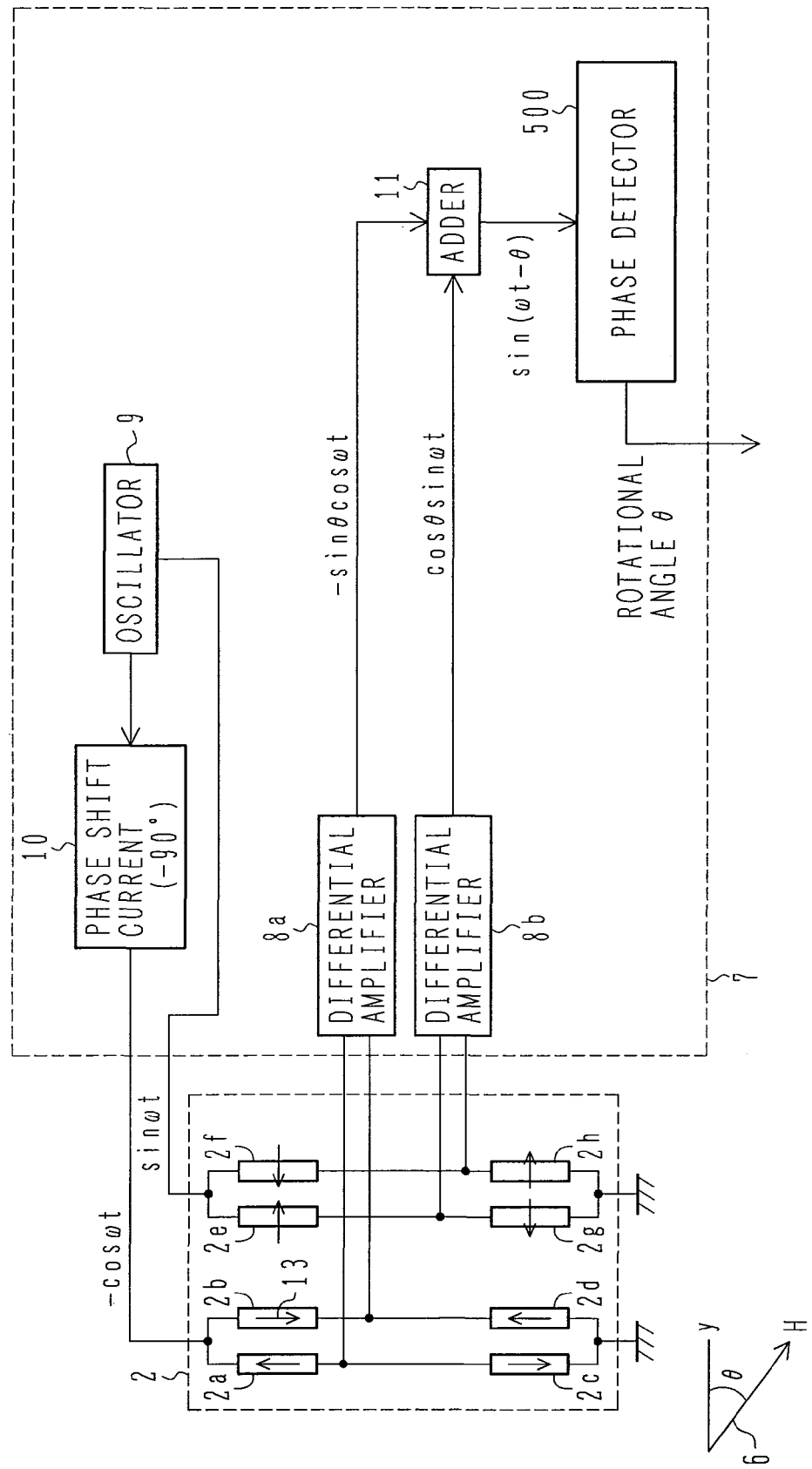
FIG. 18 is a block diagram showing the construction of an angle sensor according to a still further embodiment of the present invention.

FIG. 18 is a block diagram of a rotational angle sensor according to a sixth embodiment of the present invention. In this sixth embodiment, the phase shift circuit 10 described in the fifth embodiment of FIG. 14 is disposed on the output side of the oscillator circuit 9.

An AC voltage −cos(ωt) is supplied from the oscillator circuit 9 to the first Wheatstone bridge circuit (2a, 2b, 2c and 2d) through the phase shift circuit 10, while an AC voltage sin(ωt) is supplied from the oscillator circuit 9 to the second Wheatstone bridge circuit (2e, 2f, 2g and 2h).

By such driving with AC voltages, an AC-modulated output signal −sin θ cos(ωt) is obtained from the first Wheatstone bridge circuit through the differential amplifier 8a, while an AC-modulated output signal cos θ sin(ωt) is obtained from the second Wheatstone bridge circuit through the differential amplifier 8b. A composite output signal resulting from a combination of both output signals becomes sin(ωt−θ) from Equation (4). Therefore, as in the case of the previous fifth embodiment, with use of the phase detector circuit 500 higher in noise resistance, it is possible to provide a highly accurate angle sensor of a simple circuit configuration and with an improved S/N ratio of an output signal.

Figure 19:
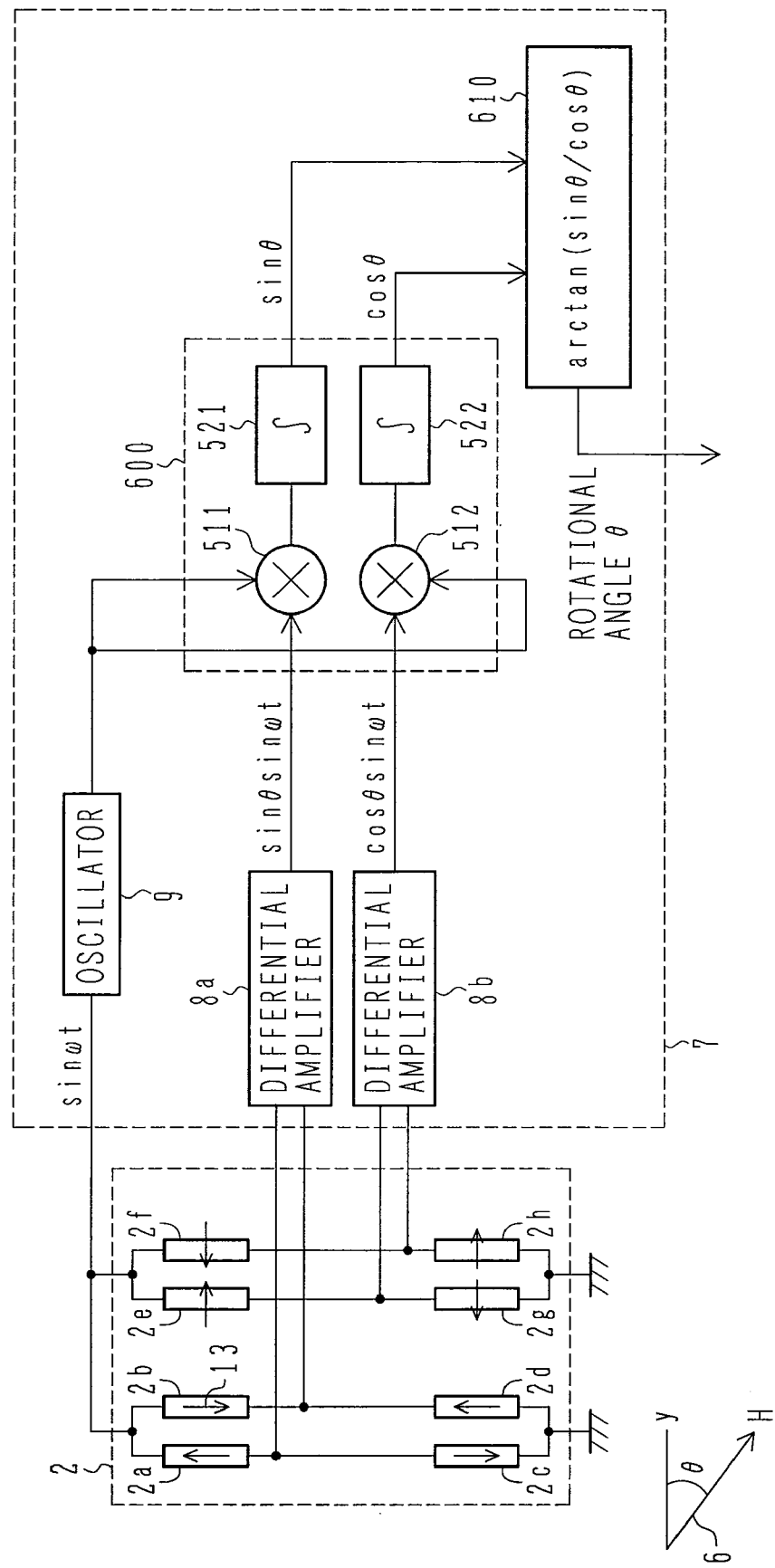
FIG. 19 is a block diagram showing the construction of an angle sensor according to a still further embodiment of the present invention.

FIG. 19 is a block diagram of a rotational angle sensor according to a seventh embodiment of the present invention.

This seventh embodiment uses a synchronous detector circuit 600. The synchronous detector circuit 600 synchronously detects the differential-amplified AC-modulated output signal sin θ sin(ωt) from the first Wheatstone bridge circuit and the differential-amplified AC-modulated output signal cos θ sin(ωt) from the second Wheatstone bridge circuit with use of the AC voltage sin(ωt) of the oscillator circuit 9.

The synchronous detector circuit 600 is made up of multipliers 511 and 512 and integrators (circuits) 521 and 522. Output signals from the first and second Wheatstone bridge circuits become output signals corresponding to sin θ and cos θ, respectively, through the synchronous detector circuit 600.

From the thus-obtained output signals corresponding to sin θ and cos θ, there is detected a rotational angle (θ) by a function calculating circuit 610 which calculates the rotational angle (θ) in accordance with the relationship θ=arctan (sin θ/cos θ) shown in Equation (3).

In this embodiment, since the synchronous detector circuit 600 is provided, the S/N ratio of the output signal is improved, and it is possible to provide a highly accurate rotational angle sensor with diminished waveform distortion of the output voltage without the need of expanding the scale of the signal processing circuit section. It is evident that the construction using the synchronous detector circuit 600 to improve the S/N ratio of the output signal is also applicable to the conventional Wheatstone bridge circuit using MR elements.

In the above embodiments, if another circuit for correcting an offset voltage caused by the asymmetry of each GMR element or for correcting the asymmetry of signal amplification is added after differential amplification of the first and second Wheatstone bridge circuits, it is possible to provide an angle sensor still higher in accuracy.

Next, a description will be given below about an abnormal condition detecting function of a rotational angle sensor using a phase detector circuit 500 according to the present invention.

Figure 20:
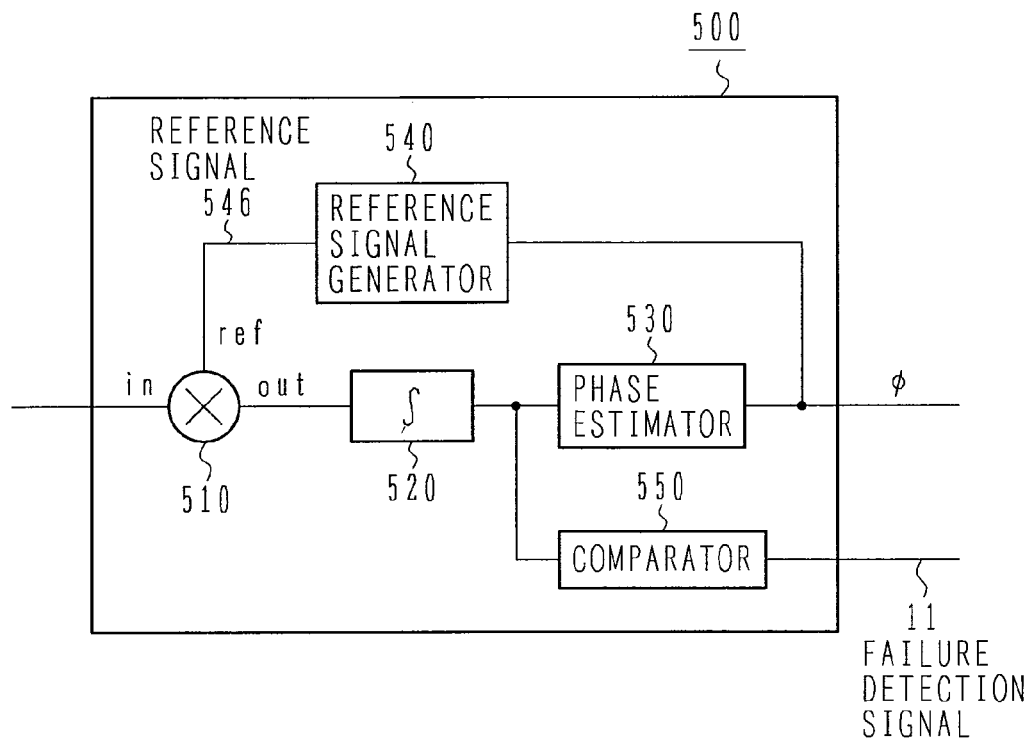
FIG. 20 is a block diagram of a phase detector circuit having an abnormal condition detecting function.

FIG. 20 is an example of a phase detector circuit 500 having an abnormal condition detecting function. In this example, an output of an integrator (circuit) 520 is compared with a preset threshold value in a comparator circuit 550. If it is within a predetermined range, it is determined to be normal. Conversely, if it departs from the predetermined range, it is determined to be abnormal, and an abnormal condition detection signal 110 is turned ON.

According to the example shown in FIG. 20, in a normal condition, the output of the integrator (circuit) 520 takes a predetermined value. Therefore, the threshold value for detecting an abnormal condition may be set up and down at a certain width with respect to the predetermined value. In this example, a check is made to see if the phase of the reference signal 546 can follow up the input signal or not, so that it is possible to detect whether the operation of the phase detector circuit 500 is normal or not and whether a relation such as a relative amplitude ratio of sin and cos output signals in the Wheatstone bridge circuits of GMR elements is normal or not. For example, it is possible to detect a trouble of a signal caused by layer short of wiring of GMR elements.

Moreover, since the amplitude of the sin and cos output signals in the Wheatstone bridge circuits of GMR elements is reflected in the output of the integrator (circuit) 520, it is possible to detect whether the absolute amplitude of the sin and cos output signals in the Wheatstone bridge circuits of GMR elements is normal or not. For example, it is possible to detect an amplitude variation of sin(ωt) caused by some trouble of the oscillator circuit 9.

Further, the amplitude of a signal component such as a noise component not to be contained but mixed into the sin and cos output signals in the Wheatstone bridge circuits of GMR elements is reflected in the output of the integrator (circuit) 520. Therefore, it is possible to detect a worsening of the S/N ratio of the sin and cos output signals in the Wheatstone bridge circuits of GMR elements.

Figure 21:
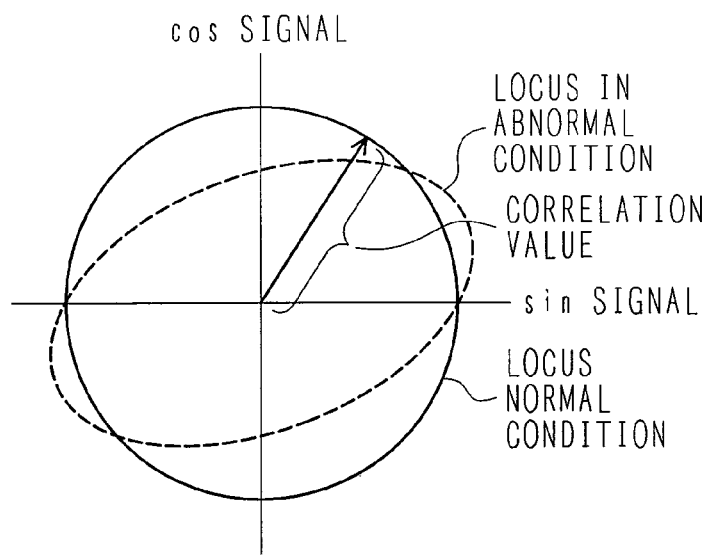
FIG. 21 is an explanatory diagram of the abnormal condition detecting function.

As shown in FIG. 21, if the sin and cos output signals in the Wheatstone bridge circuits of GMR elements are plotted along the axis of abscissa and the axis of ordinate, respectively, a plotting locus lies on a true circle when the rotational angle sensor is normal. Conversely, it deviates from the true circle when the rotational angle sensor is abnormal. In this connection, since a correlation value represents the distance from an origin, the detection of an abnormal condition can be done by detecting a deviation of the correlation value from a predetermined value.

Figure 22:
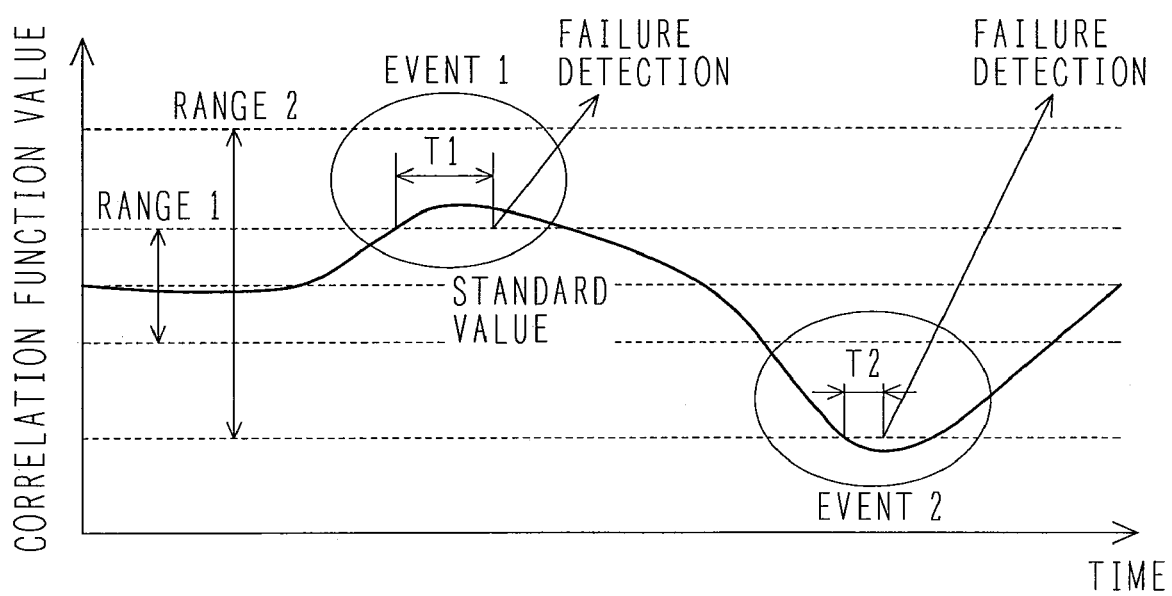
FIG. 22 is another explanatory diagram of the abnormal condition detecting function.

As shown in FIG. 22, when the correlation value departs from a predetermined range continuously for a period of time longer than a predetermined time period, it is determined that this condition is an abnormal condition, whereby an erroneous detection under the influence of a temporary noise for example can be prevented. It is also possible to set the range for detection in multiple stages and set a deviation continuance time for each stage so that an abnormal condition is determined in each stage.

In FIG. 22, Range 1 and Range 2 are set as detection ranges and T1 and T2 are set as deviation continuance times to determine an abnormal condition for each range. In Event 1, an abnormal condition is detected upon deviation from Range 1 for a period of time longer than time T1, while in Event 2, an abnormal condition is detected upon deviation from Range 2 for a period of time longer than time T2. It is preferable that the wider the range, the shorter the corresponding deviation continuance time for determining an abnormal condition.

According to this embodiment illustrated in FIG. 20, as described above, it becomes possible to detect an abnormal condition of the GMR elements 2 and the processing section 7. The operation of the system upon detection of an abnormal condition differs depending on intended purposes, but in many cases, a main relay or relays inserted in series with outputs of motor driving phases (neither shown) are turned OFF to cut off the motor driving current for fail-safe operation.

At this time, in many cases, the rotational angle of the motor output shaft is set to a predetermined angle with use of a predetermined mechanical spring mechanism. For example, an electronically controlled throttle valve is adjusted to a throttle opening at which the rotational angle of a motor output shaft becomes a rotational angle corresponding to an engine speed of about 1200 rpm. In the case of an electric brake, the rotational angle of a motor output shaft is set to a completely brake-free state. On the other hand, in the case of an electric power steering, a main relay or relays inserted in series with outputs of motor driving phases are turned OFF to bring the motor into an inoperative state, permitting a manual operation and thereby ensuring a fail-safe performance. In an electric vehicle, a main relay or relays inserted in series with outputs of motor driving phases are turned OFF to bring the motor into an inoperative state, allowing the vehicle to run by the force of inertia.

According to this embodiment described in detail above, the influence of the self-bias magnetic field (anisotropic magnetoresistive effect, AMR effect) is diminished by the supply of an alternating current to the GMR elements, and it is possible to provide a highly accurate angle sensor able to make the waveform distortion of output voltage smaller than in the related art without the need of expanding the scale of the signal processing circuit section.

The present invention is also applicable to the case where a direct current is used as a bias current. In this case, as one method, the angle sensor concerned can be constructed so as to make angle detection while changing the direction of an electric current with a certain period. There also may be adopted a method wherein a reverse bias current is applied at a non-detection timing to eliminate the storage of self-bias.

The displacement sensor according to the present invention can be used for detecting an inclination angle, a rotational angle, or a stroke, and is employable in various fields including general industrial machines, industrial robots, medical instruments, construction machines, excavators, measuring devices, transportation machines, automobiles and ships. As an example, it is employable as a rotational angle sensor for detecting a rotational angle of an automobile steering wheel or a throttle valve.

What is claimed is:

1. An angle sensor using a displacement sensor comprising:
   a sensor element having a first magnetic layer whose magnetization direction is set in a predetermined direction without being influenced by an external magnetic field and a second magnetic layer whose magnetization direction varies against the external magnetic field;
   magnetic field generating means for supplying the external magnetic field; and
   power supply means for supplying drive voltage to said sensor element;
   wherein a change in resistance value of said sensor element proportional to the difference in a magnetized state between a magnetized state of said second magnetic layer and a magnetized stage of said first magnetic layer, which occurs depending on a relative positional relation between said magnetic field generating means and said sensor element, is detected to detect a relative positional relation between said magnetic field generating element and said sensor element; and
   said displacement sensor further comprises suppressing means for suppressing an anisotropic magnetoresistive effect which occurs in said second magnetic layer and which is attributable to an electric current flowing in said sensor element on the basis of said drive voltage; and
   wherein the angle sensor comprises:
      a stator section having a plurality of giant magnetoresistive elements of a multi-layer structure, said giant magnetoresistive elements each having at least a fixed magnetic layer having a fixed magnetization direction, a non-magnetic conductive layer and a free magnetic layer; and
      a rotor section adapted to form a magnetic field and rotate in opposition to said stator section, a rotational angle of said rotor section being detected from a change in resistance value caused by the magnetic field provided from said rotor section to said GMR elements;
      characterized in that at least two Wheatstone bridge circuits having a predetermined angular offset are installed in said stator section, said Wheatstone bridge circuits each comprising a plurality of GMR elements each having a fixed magnetic layer set in a predetermined magnetization direction, an AC power supply is used as a power supply for said Wheatstone bridge circuits, an alternating current is made flow in said plural GMR elements and a rotational angle is detected on the basis of AC-modulated outputs provided from said Wheatstone bridge circuits.

2. An angle sensor according to claim 1, wherein said stator section comprises:
   a first Wheatstone bridge circuit for comprising four GMR elements, said GMR elements each having a fixed magnetic layer set in a predetermined magnetization direction parallel or anti-parallel with respect to a reference direction in which a rotor section rotational angle $\theta$ is zero;
   a second Wheatstone bridge circuit for comprising four GMR elements, said GMR elements each having a fixed magnetic layer set in a predetermined ±90° direction with respect to a reference direction in which the rotor section rotational angle is zero; and
   a signal processor for detecting the rotational angle on the basis of a differential-amplified AC-modulated output signal sin $\theta$ sin($\omega$t) provided from the first Wheatstone bridge circuit and a differential-amplified AC-modulated output signal cos $\theta$ sin($\omega$t) provided from the second Wheatstone bridge circuit, when an AC voltage of said AC power supply is set to sin($\omega$t) ($\omega$: angular frequency, t: time).

3. An angle sensor according to claim 1, further comprising a signal processor for calculating the rotational angle ($\theta$) from output signals sin $\theta$ and cos $\theta$ and in accordance with the relationship $\theta$=arctan(sin $\theta$/cos $\theta$), the output signals sin $\theta$ and cos $\theta$ being obtained from a differential-amplified AC-modulated output signal sin $\theta$ sin($\omega$t) provided from the first Wheatstone bridge circuit and a differential-amplified AC-modulated output signal cos $\theta$ sin($\omega$t) provided from the second Wheatstone bridge circuit, through a synchronous detector circuit, said synchronous detector circuit synchronously detecting an AC voltage sin($\omega$t) of said AC power supply.

4. An angle sensor according to claim 3, wherein said synchronous detector circuit has at least a multiplier and an integrator (circuit).

5. An angle sensor according to claim 1, further comprising a signal processor for detecting the rotational angle on the basis of output phase information on a composite output signal sin($\omega$t−$\theta$), said composite output signal being obtained by combining an output signal sin $\theta$ cos($\omega$t) resulting from a 90° phase shift of a differential-amplified AC-modulated output signal sin $\theta$ sin($\omega$t) provided from the first Wheatstone bridge circuit with a differential-amplified AC-modulated output signal cos $\theta$ sin($\omega$t) provided from the second Wheatstone bridge circuit.

6. An angle sensor according to claim 1, wherein said stator section comprises:
   a first Wheatstone bridge circuit for comprising four GMR elements, said GMR elements each having a fixed magnetic layer set in a predetermined magnetization direction parallel or anti-parallel with respect to a reference direction in which a rotor section rotational angle $\theta$ is zero;
   a second Wheatstone bridge circuit for comprising four GMR elements, said GMR elements each having a fixed magnetic layer set in a predetermined ±90° direction with respect to a reference direction in which the rotor section rotational angle is zero, AC voltages of said AC power supply being supplied as sin($\omega$t) ($\omega$: angular frequency, t: time) and cos($\omega$t) to said first and second Wheatstone bridge circuits, respectively; and
   a signal processor for detecting the rotational angle on the basis of output phase information on a composite output signal sin($\omega$t−$\theta$), said composite output signal sin($\omega$t−$\theta$) being obtained by combining differential-amplified AC-modulated output signals sin $\theta$ cos($\omega$t) and cos $\theta$ sin($\omega$t) provided from said first and second Wheatstone bridge circuits.

7. An angle sensor according to claim 1, further comprising a signal processor which causes a phase variable $\phi$ to be generated from a sequential phase generator circuit, causes cos $\phi$ and sin $\phi$ to be generated from a sin/cos generator circuit on the basis of the phase variable $\phi$, multiplies, with use of a multiplier circuit, a differential-amplified AC-modulated output signal sin $\theta$ sin($\omega$t) provided from the first Wheatstone bridge circuit by cos $\phi$, multiplies, with use of a multiplier circuit, a differential-amplified AC-modulated output signal cos $\theta$ sin($\omega$t) provided from the second Wheatstone bridge circuit by sin $\phi$, and detects the rotational angle from the phase variable φ (=θ) in which the term of sin(φ−θ) in a composite signal sin(φ−θ)sin(ωt) resulting from combining both said output signals by a subtractor circuit becomes zero.

8. An angle sensor according to claim 1, wherein a signal processor for detecting the rotational angle provides a phase detector circuit which comprises at least a reference signal generator circuit, a multiplier and an integrator (circuit), said multiplier being configured to multiply an input signal by a reference signal, an output of said multiplier being inputted to said integrator (circuit), and said integrator (circuit) being configured to integrate the output of said multiplier, and said reference signal generator being configured to produce the reference signal.

9. An angle sensor according to claim 8, further comprising a phase detector circuit having a comparator circuit, an output of an integrator (circuit) being inputted to said comparator circuit, said comparator circuit comparing whether an output value of said integrator (circuit) is within a predetermined range or not, and wherein when an input value of said comparator circuit deviates from the predetermined range, it is detected as an error by said phase detector circuit.

10. An angle sensor according to claim 9, wherein there are plural said predetermined ranges, said predetermined duration time is defined for each of said plural predetermined ranges, and said phase detector circuit detects a deviation from any of said predetermined ranges as an error.

11. An angle sensor according to claim 8, further comprising a phase detector circuit having a comparator circuit, and wherein when an input value of said comparator circuit deviates from a predetermined range for a period of time longer than a predetermined duration time, it is detected as an error by said phase detector circuit.

12. An angle sensor according to claim 1, further comprising means for biasing AC power-side terminals and earth-side terminals of said Wheatstone bridge circuits to a predetermined DC reference potential, and voltage obtained by the addition of a DC reference potential and a DC voltage is applied to the AC power-side terminals.

13. An angle sensor according to claim 1, further comprising a signal processor which stores in memory means a deviation angle α between a reference direction in which the rotor section rotational angle θ is zero and the magnetization direction of the fixed magnetic layers of the GMR elements constituting said Wheatstone bridge circuits, and then corrects and outputs the deviation angle α in accordance with the rotational angle (θ+α) obtained on the basis of the AC-modulated outputs of said Wheatstone circuits.

* * * * *